(12) United States Patent
Popovych et al.

(10) Patent No.: US 11,868,398 B1
(45) Date of Patent: Jan. 9, 2024

(54) DYNAMIC DETERMINATION OF VIDEO CORRELATION

(71) Applicant: Tubular Labs, Inc., Mountain View, CA (US)

(72) Inventors: Dmytro Popovych, Mountain View, CA (US); Michael Kamprath, Mountain View, CA (US); Andrew Huson, Goleta, CA (US)

(73) Assignee: Tubular Labs, Inc., Mountain View, CA (US)

( * ) Notice: Subject to any disclaimer, the term of this patent is extended or adjusted under 35 U.S.C. 154(b) by 0 days.

(21) Appl. No.: 17/850,646

(22) Filed: Jun. 27, 2022

(51) Int. Cl.
*G06F 16/70* (2019.01)
*G06F 16/735* (2019.01)
*G06F 16/75* (2019.01)
*G06F 16/71* (2019.01)

(52) U.S. Cl.
CPC .......... *G06F 16/735* (2019.01); *G06F 16/71* (2019.01); *G06F 16/75* (2019.01)

(58) Field of Classification Search
CPC ......... G06F 16/735; G06F 16/71; G06F 16/75
See application file for complete search history.

(56) References Cited

U.S. PATENT DOCUMENTS

| | | | |
|---|---|---|---|
| 8,935,713 B1* | 1/2015 | Gabel | G06F 16/7867 705/14.66 |
| 11,507,866 B1* | 11/2022 | Butler | G06N 20/20 |
| 2015/0112918 A1* | 4/2015 | Zheng | G06F 16/90324 706/48 |
| 2017/0083580 A1* | 3/2017 | Sheppard | G06F 16/2365 |
| 2017/0180798 A1* | 6/2017 | Goli | H04N 21/2407 |
| 2021/0409356 A1* | 12/2021 | Luo | H04L 51/046 |

* cited by examiner

*Primary Examiner* — Kristopher Andersen
(74) *Attorney, Agent, or Firm* — Van Pelt, Yi & James LLP

(57) ABSTRACT

Dynamic determination of video correlation is disclosed, including: obtaining a plurality of recorded video interactions; obtaining a plurality of recorded non-video interactions; storing, at a database, event data determined based at least in part on the plurality of recorded video interactions and the plurality of recorded non-video interactions; and determining a subset of the event data that comprises correlations between a video and non-video interactions.

18 Claims, 15 Drawing Sheets

| Panelist ID | Timestamp | Video ID | Video Category ID | Creator ID | Interaction Type | Product ID | Brand ID | Product Category ID |
|---|---|---|---|---|---|---|---|---|
| 12345 | 22-01-03:01:02 | VA945 | Skincare | Dr. Julie | View | N/A | N/A | N/A |
| 12345 | 22-01-25:11:39 | VD578 | Skincare | BeautyGuide | Comment | N/A | N/A | N/A |
| 12345 | 22-01-27:08:22 | N/A | N/A | N/A | Purchase | PQ1294 | Glow | Beauty |
| 12345 | 22-02-02:20:02 | N/A | N/A | N/A | Review | PZ3612 | Healthie | Food |
| 12345 | 22-02-12:09:52 | VS412 | Food | OrganicLyfe | View | N/A | N/A | N/A |
| 12345 | 22-02-16:12:26 | N/A | N/A | N/A | Review | PB6783 | Glow | Beauty |
| 12345 | 22-03-18:16:58 | N/A | N/A | N/A | Purchase | PA5413 | HYE | Electronics |
| 12345 | 22-04-30:20:04 | N/A | N/A | N/A | Purchase | PK9821 | Yum | Food |
| ... | ... | ... | ... | ... | ... | ... | ... | ... |

FIG. 5

DYNAMIC DETERMINATION OF VIDEO CORRELATION

BACKGROUND OF THE INVENTION

One conventional technique to determine the online activity of audience members associated with a video is to analyze the recorded web activities of users who have volunteered to have their activities tracked. For example, the recorded web activities include the sequences of webpages that users have clicked on. However, it is a challenge to calculate correlations between different web activities in an efficient manner.

BRIEF DESCRIPTION OF THE DRAWINGS

Various embodiments of the invention are disclosed in the following detailed description and the accompanying drawings.

FIG. 5 is a diagram showing an example portion of a database table storing video interaction events and product interaction events.

DETAILED DESCRIPTION

Figure 1:
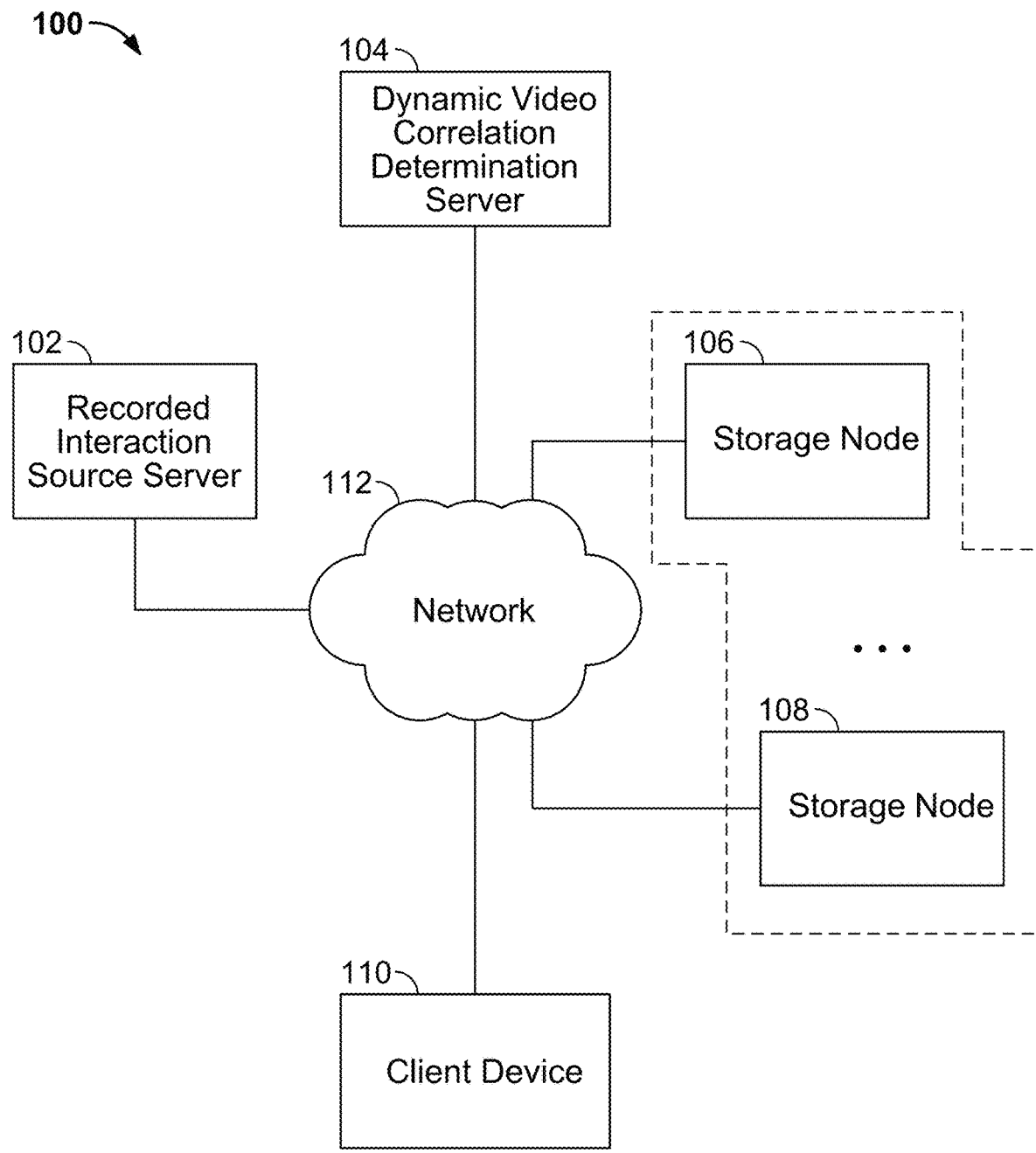
FIG. 1 is a diagram showing an embodiment of a system for dynamic determination of video correlation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of dynamic determination of video correlation are described herein. A plurality of recorded video interactions is obtained. A plurality of recorded non-video interactions is obtained. In various embodiments, a set of recorded user activity data at websites is periodically obtained from a data source. For example, the set of recorded user activity data (which is sometimes referred to as a "data panel") comprises clickstream data. For example, a data panel comprises recorded interactions (e.g., clicks, purchases, form submissions) at websites (e.g., as identified by URL) performed by users (which are referred to as "panelists" and are uniquely represented but not necessarily identifiable by their respective panelist identifiers (IDs)). As such, in various embodiments, obtained data panel(s) can include recorded video interactions (e.g., recorded user interactions at websites/URLs pertaining to video sharing/viewing platforms) and also include recorded non-video interactions (e.g., recorded user interactions at websites/URLs pertaining to content other than videos, such as, for example, retailers or non-video media). For example, the recorded video interactions and non-video interactions may be included in the same data panel or separate data panels (but linked together based on attributing the interactions to their respective panelist IDs). Event data that is determined based at least in part on the plurality of recorded video interactions and the plurality of recorded non-video interactions are stored at a database. In various embodiments, a video event is stored in a database corresponding to each recorded video related interaction and a non-video event is stored in the database corresponding to each recorded non-video related interaction. A subset of the event data that comprises correlations between a video and non-video interactions is determined. In various embodiments, in response to a request to obtain correlations between video (or set of videos) and non-video interactions, the events in the database are searched to determine a number of distinct panelist IDs that have each performed a recorded interaction related to that video (or set of videos) within a given attribution time window to a recorded interaction related to a non-video interaction. As will be described in further detail below, the stored events in the database can be used to determine, in real-time, correlations between a given set of videos and categories (or other groupings) of items (e.g., products, books) other than videos.

While non-video interaction event data can pertain to any event related to topics/context other than videos (e.g., shared at a social video sharing and/or viewing platform), for purposes of illustration, the specific example of non-video event data that will be discussed for the remainder of this document is product interaction event data.

FIG. 1 is a diagram showing an embodiment of a system for dynamic determination of video correlation. As shown in FIG. 1, system 100 includes recorded interaction source server 102, dynamic video correlation determination server 104, storage node 106, storage node 108, network 112, and client device 110. Each of recorded interaction source server 102, dynamic video correlation determination server 104, storage node 106, and storage node 108 can communicate to each other over network 112. Network 112 comprises data and/or telecommunications networks.

Dynamic video correlation determination server 104 is configured to obtain sets of recorded user online activity data from recorded interaction source server 102. In some embodiments, dynamic video correlation determination server 104 is configured to obtain a new set of recorded user online activity data from recorded interaction source server 102 at regular intervals (e.g., weekly). In some embodiments, a set of recorded user online activity data provided by recorded interaction source server 102 comprises click-stream data, which comprises recorded clicks/selections/viewing of media (e.g., videos) at various websites by users who have opted in to having their online activities recorded (e.g., by a plug-in in a web browser). In various embodiments, a user whose activities are recorded within the set of recorded user online activity data is referred to as a "panelist" and is also uniquely represented by a corresponding "panelist identifier (ID)" in the set of recorded user online activity data. In some embodiments, while a panelist ID uniquely represents the corresponding user within the set of recorded user online activity data (i.e., each recorded activity associated with the same panelist ID can be attributed to the same user), the panelist ID is anonymized in the sense that the panelist ID cannot be linked back to the user (e.g., because the panelist ID does not include information that can be used to identify the corresponding user). In various embodiments, each recorded user online activity includes at least the following pieces of information: a panelist ID of the user that had performed the activity, the device ID associated with the device that was used by the user, the uniform resource locator (URL) associated with the visited webpage, and the timestamp at which the activity was performed. In some embodiments, the type of activity/interaction that was performed by a user can be specified in the recorded activity and in some other embodiments, the type of user online activity that was performed by a user can be inferred from the URL associated with that activity.

In response to obtaining a new set of recorded user online activity data from recorded interaction source server 102, dynamic video correlation determination server 104 is configured to ingest the set of recorded user online activity data by determining events related to video interaction and events not related to video interaction from the set of recorded user online activity data. In some embodiments, dynamic video correlation determination server 104 is configured to identify whether a recorded activity pertains or does not pertain to a video interaction by analyzing the recorded activity's corresponding URL. For example, dynamic video correlation determination server 104 is configured to determine that a recorded activity pertains to a video related interaction if the URL includes a domain name of a known video sharing and/or viewing platform. Also, for example, dynamic video correlation determination server 104 is configured to determine that a recorded activity pertains to a non-video related interaction (e.g., an interaction associated with a product) if the URL includes a domain name that is not associated with a known video sharing and/or viewing platform and/or is associated with a known retailer or other platform (e.g., a book reviewing platform, a restaurant reviewing platform, a news outlet, a messaging platform, etc.). Dynamic video correlation determination server 104 is configured to store an entry corresponding to each video related interaction or to each non-video related interaction in a database. In various embodiments, each database entry that stores information related to an activity includes at least some of the pieces of information that were included in/derived from the obtained data including one or more of the following: a panelist ID, a video ID (if applicable), a non-video ID (if applicable), an interaction type, and a timestamp. In some embodiments, the database is implemented as a distributed database in which portions of data (which are sometimes referred to as "shards") to be stored at the database are stored across more than one storage node. In the example of system 100, the distributed database that stores event data is implemented across at least storage nodes 106 and 108. As will be described in further detail below, in addition to storing each video interaction and each non-video interaction from the set of recorded user online activity data that is obtained from recorded interaction source server 102 in the (e.g., distributed) database, dynamic video correlation determination server 104 is configured to add to each event entry, one or more additional fields of (e.g., previously inferred/aggregated) data that are relevant to the determined video or non-video activity to the database entries. In some embodiments, to ensure that later (requested) computations of correlations between video and non-video content can be performed efficiently, dynamic video correlation determination server 104 is configured to sort all event entries at (e.g., each storage node of) the (e.g., distributed) database by their respective panelist IDs in advance of receiving requests. Similarly, to ensure that later (requested) computations of correlations between video and non-video content can be performed efficiently, in some embodiments, dynamic video correlation determination server 104 is configured to compute and store the respective number of distinct/unique panelist IDs (which are sometimes referred to as "cardinality values") corresponding to each video and each non-video item, among other cardinality values, in advance of receiving requests. Then, when a request for a type of correlation is received later, the pre-computed cardinality values can be retrieved to efficiently compute the requested type of correlation. In some other embodiments, to ensure that later (requested) computations of correlations between video and non-video content can be performed efficiently, dynamic video correlation determination server 104 is configured to generate a respective statistical counting data structure (e.g., HyperLogLog) corresponding to each possible video grouping (e.g., video ID, creator ID, video category ID, etc.) and each possible non-video grouping (e.g., product ID, brand ID, product category ID, etc.) based on the database entries, in advance of receiving requests. Then, when a request for a type of correlation is received later, the relevant statistical counting data structures are retrieved to efficiently estimate/compute the relevant cardinality values.

In various embodiments, dynamic video correlation determination server 104 is configured to receive a request to determine respective correlations between a specified set of videos and non-video categories (or other non-video groupings). In some embodiments, the request is received from a web browser that is running at client device 110 that is provided by dynamic video correlation determination server 104. For example, client device 110 comprises a desktop computer, a laptop computer, a mobile device, a tablet device, or any networked device. For example, the set of videos in the request can be specified by a video ID, a video creator ID, a video channel ID, or any other video identifying attributes. Also, for example, the non-video categories in the request can be specified as product categories, brands, book categories, and restaurant categories. As will be described in further detail below, in response to the request, in some embodiments, dynamic video correlation determination server 104 is configured to search the database for video interaction events that match the identified set of videos in the request. Then, dynamic video correlation determination server 104 is configured to search, for each matching video interaction event, any non-video interaction event(s) that are performed by the same panelist ID as the matching video interaction event and had also occurred (e.g., have timestamps) within a configurable attribution time window of that matching video interaction event. The number of distinct panelist IDs that have performed a matching video interaction event and have performed at least one non-video interaction within the configurable attribution time window is determined for each non-video category. Dynamic video correlation determination server 104 is configured to determine at least one correlation value between the specified set of videos and each non-video category based on this respective number of distinct panelist IDs and the cardinality values (e.g., that were computed prior to receiving the request, are dynamically computed based on the statistical counting data structures, or are dynamically determined based on processing rows of raw event data). Dynamic video correlation determination server 104 is configured to rank the non-video categories according to their respective correlation values relative to the specified set of videos and present at least a portion of these rankings at a user interface that is presented at client device 110. As will be described in further detail below, dynamic video correlation determination server 104 performs similar computations and presentations in response to a request for respective correlations between a specified non-video category (or other non-video grouping) and video categories (or other types of video groupings).

As shown in system 100 of FIG. 1, prior to processing a request for the correlation between a video and a non-video item, dynamic video correlation determination server 104 is configured to ingest a set of recorded user online activity data and efficiently store the data as entries of events in a (e.g., distributed) database. As such, later in response to a received request for the correlation between a video and a non-video item, dynamic video correlation determination server 104 can leverage the stored event data in the database (and any pre-computed cardinality values) to quickly compute the correlation values between videos matching a specified video identifier and each of multiple non-video categories or the correlation between a non-video category matching a specified non-video identifier and each of multiple video categories (or other groupings). The computations can be performed in real-time in response to the request and also be provided at a user interface to provide insight on video and non-video events that are related to each other by the configurable attribution window. In some embodiments, the computations could also have been anticipated and performed/cached prior to receiving the request. One example inference that can be drawn from the determined correlations is a possible causation or influence of users' interactions with a video on non-video related activities performed by those same users, without needing to personally identify or survey the users in a way that would infringe on their privacy.

Figure 2:
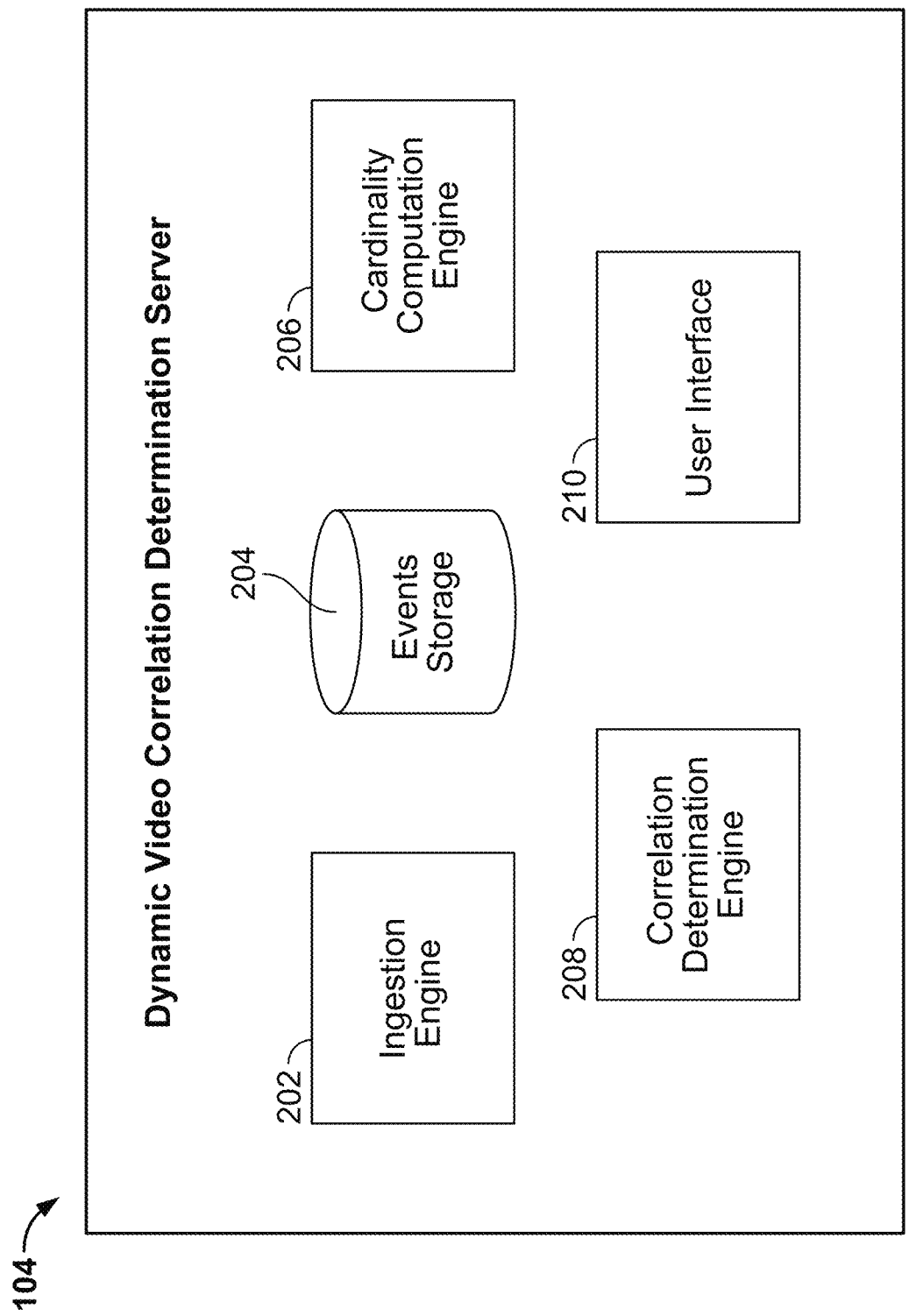
FIG. 2 is a diagram showing an example of the dynamic determination of a video correlation server in accordance with some embodiments.

FIG. 2 is a diagram showing an example of the dynamic determination of a video correlation server in accordance with some embodiments. In the example of FIG. 2, the dynamic video correlation comprises ingestion engine 202, events storage 204, cardinality computation engine 206, correlation determination engine 208, and user interface 210. Each of ingestion engine 202, cardinality computation engine 206, correlation determination engine 208, and user interface 210 may be implemented using a hardware (e.g., processor) and/or software. Events storage 204 may be implemented using any type of appropriate storage medium. In some embodiments, dynamic video correlation determination server 104 of system 100 of FIG. 1 can be implemented using the example dynamic video correlation determination server of FIG. 2.

Ingestion engine 202 is configured to obtain sets of recorded user online activity data ("data panels") (e.g., periodically or at regular intervals). Ingestion engine 202 is configured to parse through a set of recorded user online activity data to identify recorded activities related to video interactions (e.g., activities of viewing, commenting on, liking, sharing, and adding to a playlist a video) at a video sharing/viewing platform and non-video related interactions (e.g., activities that do not involve a video at a video sharing/viewing platform). In some embodiments, besides recorded activities related to video interactions, only recorded activities related to one or more predetermined types of interactions are stored for further processing. Put another way, in some embodiments, besides recorded activities related to video interactions, recorded activities that are not related to one or more predetermined types of interactions are discarded and not further processed. One example of a predetermined type of non-video related interactions is product related interactions (e.g., activities that involve buying, viewing, reviewing, and/or adding a product to a virtual shopping cart at the website of a retailer). In some embodiments, ingestion engine 202 is configured to store event data corresponding to the determined video interactions from the set of recorded user online activity data at a database that is implemented by events storage 204. For example, each instance of a video interaction is stored as a corresponding entry (e.g., row) in the database with information associated with the video interaction including one or more of: a panelist ID, a video ID, an interaction type, and a timestamp. In some embodiments, ingestion engine 202 is configured to also store event data corresponding to the determined non-video interactions from the set of recorded user online activity data at the database. Where the non-video interactions comprise product interactions, for example, each instance of a product interaction is stored as a corresponding entry (e.g., row) in the database with information associated with the product interaction including one or more of: a panelist ID, a product ID, an interaction type, and a timestamp. In some embodiments, ingestion engine 202 is configured to determine additional field values to store in the database entries of the video interaction events and the non-video interaction events. In some embodiments, ingestion engine 202 is configured to look up (previously aggregated) metadata associated with videos, video creators, and non-video categories, for example, and then store some of the relevant looked up metadata in the database entries corresponding to the video interaction events and the non-video interaction events. In some embodiments, ingestion engine 202 is configured to store both video interaction events and non-video interaction events in the same table. In some embodiments, ingestion engine 202 is configured to delete (or mark for deletion) all existing entries associated with video interaction events and non-video interaction events from the table in response to receiving a new set of recorded user online activity data and repopulate the table with new entries pertaining to the video interaction events and non-video interaction events that are determined from the new set of recorded user online activity data.

Events storage 204 is configured to store at least a portion of the table that includes information pertaining to both video interaction events and non-video interaction events. In some embodiments, events storage 204 comprises a database that is configured to store the table that includes information pertaining to both video interaction events and non-video interaction events. In some embodiments, events storage 204 comprises a portion (a shard) of a distributed database that is implemented across multiple storage nodes, of which the example dynamic video correlation determination server of FIG. 2 is one. In some embodiments, the event data (e.g., entries/rows of video interaction events and non-video interaction events) in the table is sorted by panelist ID such that entries/rows related to the same panelist ID are adjacent to each other in the table. Sorting entries/rows of the table by panelist ID will ensure that searches for events pertaining to the same panelist ID (e.g., in response to a request for a requested computation) can be efficiently made across adjacent entries of the table. Where the table is stored in a distributed database, in some embodiments, all the entries/rows of video interaction events and non-video interaction events pertaining to the same panelist ID are stored on the same storage node of the distributed database. Put another way, in some embodiments, where the table is stored in a distributed database, no two storage nodes will store entries/rows of interaction events pertaining to the same panelist ID. Causing entries/rows of the table belonging to the same panelist ID to be stored at the same storage node will ensure that deduplication will not need to be performed when matching entries are found across multiple storage nodes in response to a request for a requested computation. As such, in some embodiments, where the table is stored in a distributed database, each storage node of the database stores a portion of the table and that corresponding portion of the table is sorted by panelist ID. In some embodiments, (e.g., each portion) of the table is also sorted by timestamp within the entries/rows that have been sorted/grouped by panelist ID.

Cardinality computation engine 206 is configured to compute one or more cardinality values associated with the video interaction events and the non-video interaction events that are stored at the table in the (e.g., distributed) database. In some embodiments, cardinality computation engine 206 is configured to compute one or more cardinality values associated with the video interaction events and the non-video interaction events that are derived from a set of recorded user online activity data in response to receiving each new set of recorded user online activity data. In various embodiments, a "cardinality value" refers to the number of distinct panelist IDs (e.g., the number of distinct/unique users) that are included in the table with respect to at least a subset of field/column values within the table. In a first example, cardinality computation engine 206 can determine the video panelist ID cardinality, which is the total number of distinct panelist IDs that are currently included in the video interaction events currently included in the table (e.g., and that were determined from a set of recorded user online activity data). In a second example, cardinality computation engine 206 can determine a video creator ID cardinality corresponding to a particular video creator ID, which is the number of distinct panelist IDs that have video interaction events with that video creator ID currently included in the table (e.g., and that were determined from a set of recorded user online activity data). In some embodiments, cardinality computation engine 206 can compute and store these cardinality values in advance of receiving queries for requested computations so that these stored values can be later retrieved to efficiently respond in real-time to query requests, as will be described in further detail below. In some embodiments, cardinality computation engine 206 can dynamically compute these cardinality values in real-time after receiving a query request for correlation values between a video grouping and a non-video grouping (e.g., using previously generated statistical counting data structures corresponding to that video grouping and that non-video grouping).

Correlation determination engine 208 is configured to receive requests for correlation values between videos and non-video events. In some embodiments, correlation determination engine 208 is configured to receive a request to compute a correlation between a set of videos and each of one or more non-video categories (or other non-video related groupings). For example, the request can identify a set of videos using video identifying information comprising a video category ID or a video creator ID. In response to such a request, correlation determination engine 208 is configured to search through the database table (stored across one or more locations/storage nodes) storing video interaction events and the non-video interaction events to determine video interaction events that match the video identifying information that is included in the request. Then, in some embodiments, for each matching video interaction events, correlation determination engine 208 is configured to look up, in the database table, whether one or more non-video interaction events belonging to the same panelist ID that was included in the matching video interaction event have corresponding timestamps within an attribution time window relative to the timestamp in the matching video interaction event. If correlation determination engine 208 determines that a panelist ID has a matching video interaction event and also at least one non-video interaction event that has occurred within the attribution time window relative to the matching video interaction event, then correlation determination engine 208 determines that this panelist ID is included in an overlap (intersection) between the set of videos and a non-video category associated with the at least one non-video interaction event. Correlation determination engine 208 determines a corresponding number of distinct panelist IDs that are in the overlap between the set of videos and each of the non-video categories and then uses this overlap value along with one or more of the (previously computed or dynamically generated) cardinality values, as described above, to compute one or more correlation values between the set of videos and each non-video category. Similarly, in some embodiments, correlation determination engine 208 is configured to receive a request to compute a correlation between a non-video category (or other non-video related groupings) and each of one or more sets of videos. Correlation determination engine 208 can compute correlation value(s) between the non-video category and each set of videos in a manner similar to how correlation value(s) are computed between the set of videos and each non-video category, as will be described in further detail below.

In some embodiments, requests to correlation determination engine 208 can be received via a user interface provided by user interface 210. For example, the user interface is presented at a webpage. For example, the user interface to receive a request can enable a user to specify identifying information associated with a set of videos and also specify one type of non-video category/grouping for which it is desired to obtain correlation value(s) between that set of videos and each non-video category/grouping of that type. Similarly, for example, the user interface to receive a request can enable a user to specify identifying information associated with a particular non-video category/grouping and a type of sets of videos for which it is desired to obtain correlation value(s) between the particular non-video category/grouping and each set of videos of that type. In some embodiments, in response to a given request, user interface 210 is configured to present at the user interface (that is presented at a webpage) a ranked list of non-video categories/groupings based on their respective correlation values with a specified set of videos. In some embodiments, in response to a given request, user interface 210 is configured to present at the user interface (that is presented at a webpage) a ranked list of sets of videos based on their respective correlation values with a particular non-video category/ranking. In addition to the rankings, in some embodiments, user interface 210 can also present historical correlation values at one or more points in time to show the trend of correlation over time.

Figure 3:
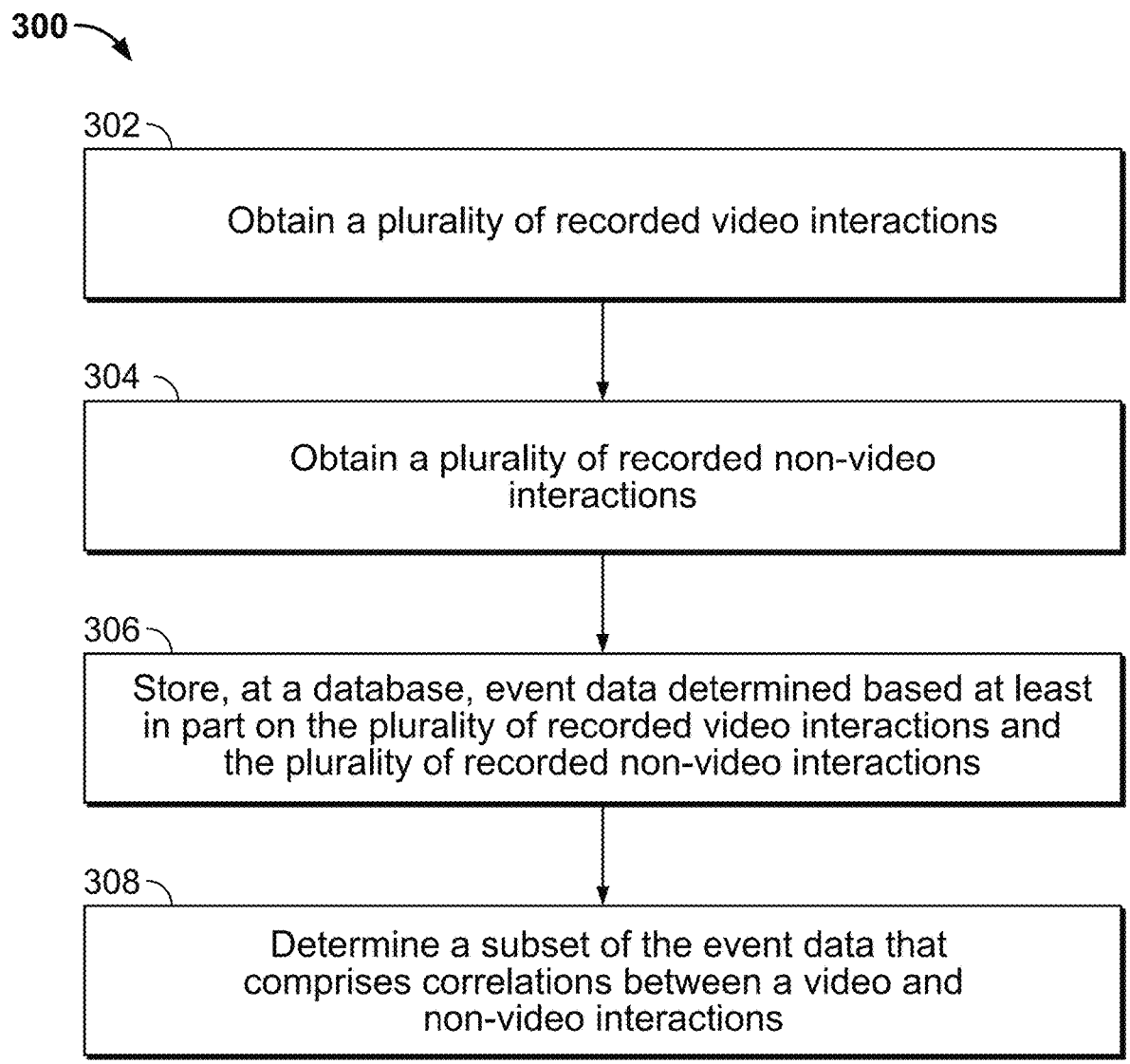
FIG. 3 is a flow diagram showing an embodiment of a process for dynamic video correlation determination.

FIG. 3 is a flow diagram showing an embodiment of a process for dynamic video correlation determination. In some embodiments, process 300 is implemented at a dynamic video correlation determination server such as dynamic video correlation determination server 104 of system 100 of FIG. 1.

At 302, a plurality of recorded video interactions is obtained. In various embodiments, video interactions as well as non-video interactions of users are obtained in a set of recorded user online activity data. In the set of recorded user online activity data, each recorded interaction includes a panelist ID (e.g., which uniquely represents a user), a URL that was visited by the user, and a timestamp. The set of recorded user online activity data is parsed to determine video interactions as well as non-video interactions. Whether a recorded interaction pertains to a video (and is therefore referred to as a "video interaction event") or not can be determined from the URL that is included in the recorded activity. For example, the URL comprises a domain name that is associated with a video sharing/viewing platform and so that activity comprises a video interaction event. Also for example, the URL comprises a domain name that is not associated with a video sharing/viewing platform and/or matches a domain name of a known retailer and so that activity comprises a non-video interaction event.

At 304, a plurality of recorded non-video interactions is obtained.

At 306, event data determined based at least in part on the plurality of recorded video interactions and the plurality of recorded non-video interactions is stored at a database. A corresponding entry (e.g., row) is stored in a database table corresponding to each instance of a recorded video interaction. A corresponding entry (e.g., row) is also stored in a database table corresponding to each instance of a recorded non-video interaction. In some embodiments, each row in the database table includes information derived from information related to the corresponding event in the set of recorded user online activity data as well as additional information obtained elsewhere (e.g., relevant video or non-video data that was previously stored).

At 308, a subset of the event data that comprises correlations is determined between a video and non-video interactions. In some embodiments, in response to a request to determine correlation values between a set of videos and each non-video category (or another grouping) (or between a non-video category and each set of videos), relevant event data that matches the request parameters is dynamically searched for in the database. In some embodiments, the found database event data is then used with one or more cardinality values to determine the relevant correlation values. In some embodiments, the cardinality values were pre-computed. In some embodiments, at least some of the cardinality values were computed in real-time (e.g., after receiving the request) using previously generated statistical counting data structures (e.g., corresponding to that set of videos and each non-video category). In some embodiments, at least some of the cardinality values were computed in real-time (e.g., after receiving the request) based on counting the raw event data.

Information related to the videos and/or non-video categories can be presented at a user interface based on the determined correlation values.

Figure 4:
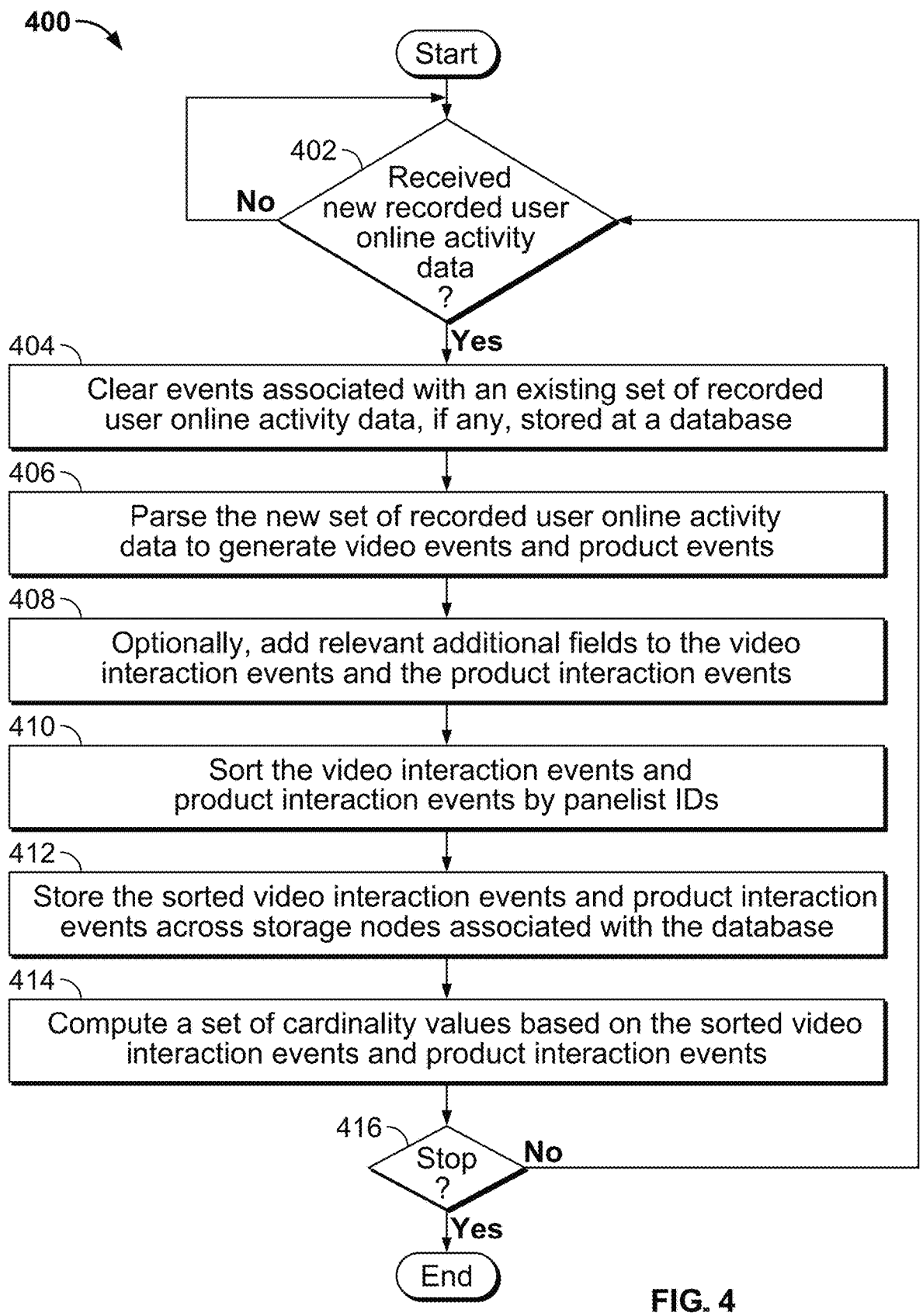
FIG. 4 is a flow diagram showing an example of a process for ingesting a new set of recorded user online activity data in accordance with some embodiments.

FIG. 4 is a flow diagram showing an example of a process for ingesting a new set of recorded user online activity data in accordance with some embodiments. In some embodiments, process 400 is implemented at a dynamic video correlation determination server such as dynamic video correlation determination server 104 of system 100 of FIG. 1. In some embodiments, steps 302, 304, and 306 of process 300 of FIG. 3 can be implemented, at least in part, using process 400.

Process 400 is an example process of ingesting new recorded user online activity data to be stored at a database, for example, before that database is queried for correlations.

At 402, whether a new set of recorded user online activity data is received is determined. In the event that a new recorded user online activity data is received, control is transferred to 404. Otherwise, in the event that a new recorded user online activity data is not received, step 402 is returned to after waiting (e.g., a predetermined length of time). In some embodiments, a new set of recorded user online activity data is obtained from a (e.g., third-party) recorded interaction source server periodically. In some embodiments, a new set of recorded user online activity data is received at regular intervals (e.g., weekly). In some embodiments, each new set of recorded user online activity data includes recorded activity across a recent window of time (e.g., the last six months).

At 404, events associated with an existing set of recorded user online activity data, if any, stored at a database are cleared. In some embodiments, because it is sufficiently fast to repopulate the database with events from the new set of recorded user online activity data, the existing entries/rows of event data that are stored at a database associated with a previous set of recorded user online activity data are cleared/deleted/marked for deletion.

At 406, the new set of recorded user online activity data is parsed to generate video interaction events and product interaction events. Each recorded activity can be thought of as an interaction event. The new set of recorded user online activity data is filtered for recorded activities pertaining to videos (e.g., a user represented by a corresponding panelist ID has viewed, shared, reviewed, or otherwise interacted with a video at a video sharing/viewing platform), and (in the example of process 400) also recorded activities pertaining to products (e.g., a user represented by a corresponding panelist ID has purchased, reviewed, shared, or otherwise interacted with a product at the website of a retailer/vendor). Each recorded activity comprising a video activity is referred to as a "video interaction event" and each recorded activity comprising a product activity is referred to as a "product interaction event."

At 408, optionally, relevant additional fields are added to the video interaction events and the product interaction events. In some embodiments, aggregated metadata (e.g., stored locally at the dynamic correlation determination server or stored at a third-party server) pertaining to videos that are identified in the video interaction events are queried to determine values corresponding to one or more fields that may not be included in the recorded activity data. For example, with respect to videos, video metadata (e.g., content graphs) that assign a unique ID to each video and to each video creator can be aggregated from one or more video sharing and/or viewing platforms over time. As such, each video interaction event may include values taken from fields (e.g., panelist ID, timestamp, interaction type) that were included in the recorded activity data but also include values of fields (e.g., video ID, video category, creator ID) that were queried based on the field values that were included in the recorded activity data. These additionally queried field values are stored with the field values that were included in the recorded activity data in the database entry corresponding to the video interaction event.

Similarly, in some embodiments, aggregated metadata (e.g., stored locally at the dynamic correlation determination server or stored at a third-party server) pertaining to products that are identified in the product interaction events are queried to determine values corresponding to one or more fields that may not be included in the recorded activity data. For example, with respect to products, product metadata (e.g., content graphs) that assign a unique ID to each product and to each product brand can be aggregated from one or more retailer websites or inventories over time. As such, each product interaction event may include values taken from fields (e.g., panelist ID, timestamp, interaction type) that were included in the recorded activity data but also include values of fields (e.g., product ID, product category, brand ID) that were queried based on the field values that were included in the recorded activity data. These additionally queried field values are stored with the field values that were included in the recorded activity data in the database entry corresponding to the product interaction event. FIG. 5, below, shows an example of such a database table.

At 410, the video interaction events and the product interaction events are sorted by panelist IDs. The video interaction events and the product interaction events are sorted by their respective panelist IDs and timestamps. Put another way, the video interaction events and the product interaction events are grouped together by their respective panelist IDs and ordered by their timestamps such that events including the same panelist ID are grouped together in the database table.

At 412, the sorted video interaction events and product interaction events are stored across storage nodes associated with the database. As mentioned above, the sorted video interaction events and product interaction events are grouped by their respective panelist IDs and as such, entries associated with events corresponding to the same panelist IDs are stored adjacent/contiguous to each other in the database. Where the database is distributed across more than one storage node, entries associated with events corresponding to the same panelist IDs are stored on the same storage node. Put another way, where the database is distributed across more than one storage node, no two storage nodes will store entries associated with events corresponding to the same panelist ID.

At 414, a set of cardinality values is computed based on the sorted video interaction events and product interaction events. In various embodiments, a cardinality value refers to a number of unique panelist IDs (and hence, unique users) among at least a specified subset of events stored in the database. For example, in some embodiments, one or more cardinality values can be computed across one or more fields in the database table and then cached so that they can be used to assist in subsequent real-time correlation computations between videos and products, as will be described in further detail below. For example, FIG. 6 describes some example cardinality values that can be determined based on the database table prior to processing a request for correlation values.

At 416, whether ingesting new sets of recorded user online activity data should be stopped is determined. In the event that new sets of recorded user online activity data should be stopped, process 400 ends. Otherwise, in the event that new sets of recorded user online activity data should not be stopped, control is returned to step 402. For example, process 400 can be stopped in the event that no new set of recorded user online activity is expected to be received or if the dynamic correlation determination server loses power.

FIG. 5 is a diagram showing an example portion of a database table storing video interaction events and product interaction events. Table 500 includes entries/rows storing video interaction events and product interaction events. In some embodiments, the entries/rows of event data are stored in table 500 using a process such as process 400 of FIG. 4. In the example of FIG. 5, table 500 includes fields that are common to video interaction events and product interaction events (e.g., panelist ID, timestamp, interaction type), fields that are relevant only to video interaction events (e.g., video ID, video category ID, creator ID), and fields that are relevant only to product interaction events (e.g., product ID, brand ID, and product category ID). The values corresponding to the fields that are common to both video interaction events and product interaction events (e.g., panelist ID, timestamp, interaction type) may be obtained directly from the recorded user online activity data. The values corresponding to fields that are relevant only to video interaction events (e.g., video ID, video category ID, creator ID) may either be obtained directly from the recorded user online activity data or determined by querying stored aggregated metadata based on information that was included in the recorded user online activity data. For example, a recorded user video interaction event included a URL that identified the web address at which the video was found and that URL can be used to query for relevant stored metadata such as video ID, video category ID, and creator ID. The values corresponding to fields that are relevant only to product interaction events (e.g., product ID, product category ID, brand ID) may either be obtained directly from the recorded user online activity data or determined by querying stored aggregated metadata based on information that was included in the recorded user online activity data. For example, a recorded user video interaction event included a URL that identified a webpage at which information associated with the product was found and that URL can be used to query for relevant stored metadata such as product ID, product category ID, and brand ID. For example, the URL can be used to query a local database or a third-party database for relevant stored metadata such as product ID, product category ID, and brand ID.

As shown in table 500, each row of video interaction event data (including rows 502a, 502b, and 502c) includes values of relevant fields (e.g., panelist ID, timestamp, video ID, video category ID, creator ID, and interaction type) but not for other fields (e.g., product ID, brand ID, and product category ID). Similarly, each row of product interaction event data (including rows 504a, 504b, 504c, 504d, and 504e) includes values of relevant fields (e.g., panelist ID, timestamp, interaction type, product ID, brand ID, and product category ID) but not for other fields (e.g., video ID, video category ID, and creator ID). Also, as shown in table 500, both rows 502a, 502b, and 502c including video interaction event data and rows 504a, 504b, 504c, 504d, and 504e including product interaction event data include the same panelist ID ("12345") and are therefore grouped together because the rows of table 500 are sorted by panelist ID. Furthermore, rows 502a, 502b, and 502c including video interaction event data and rows 504a, 504b, 504c, 504d, and 504e including product interaction event data are also ordered by their timestamps because the rows are also sorted by timestamps in addition to panelist ID. Similarly, if the database were distributed across multiple storage nodes, because rows 502a, 502b, and 502c and 504 are associated with the same panelist ID, they will be stored on the same storage node. As will be described in further detail below, sorting database table entries by panelist IDs and also storing all event data related to the same panelist ID on the same storage node will enable searches through events belonging to a single panelist ID (e.g., such as determining whether two events pertaining to the same panelist ID had occurred within a given attribution time window of each other) to be performed efficiently (e.g., by enabling them to be performed on a single storage node and also across adjacent rows of data).

Figure 6:
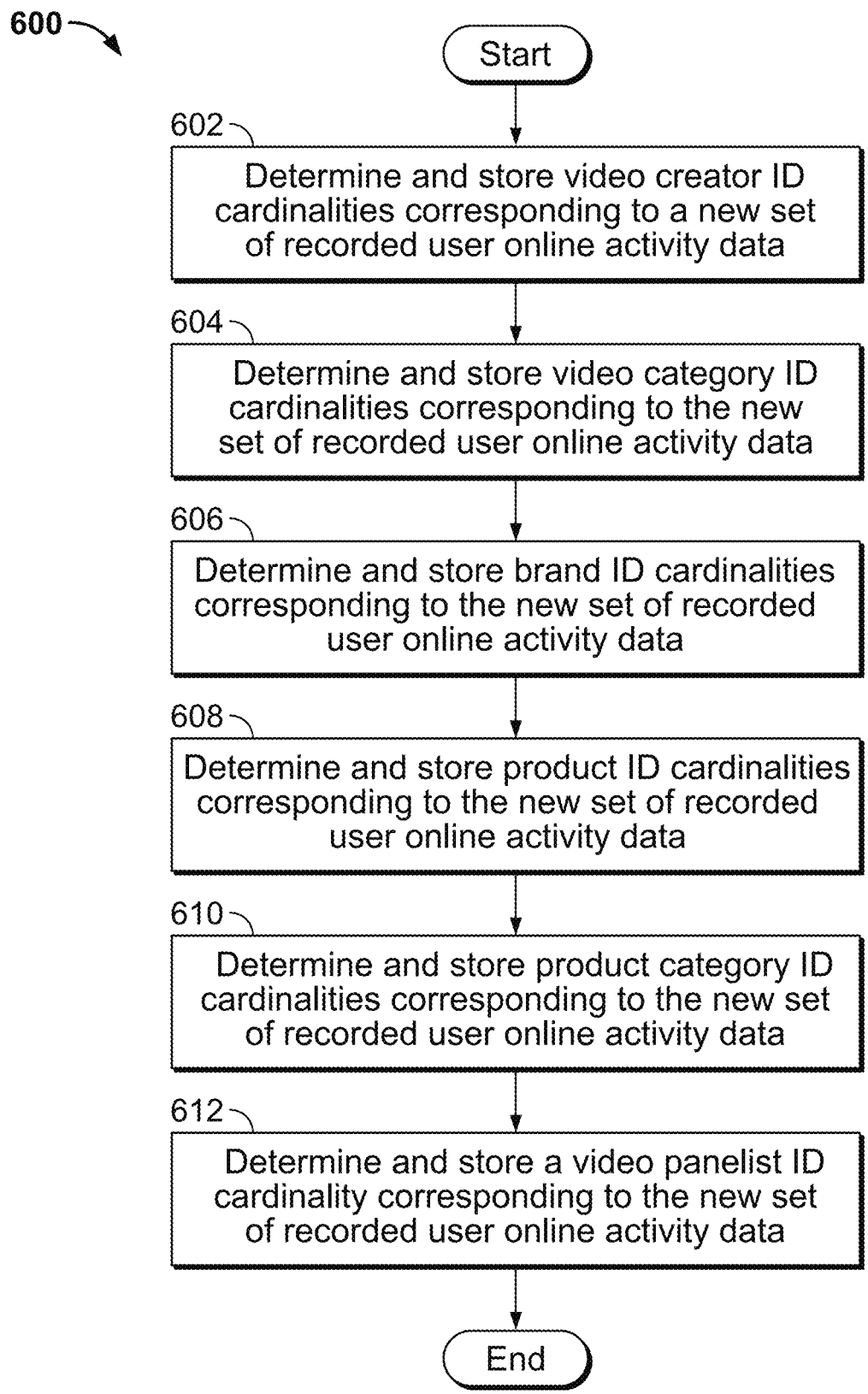
FIG. 6 is a flow diagram showing an example of a process for computing cardinality values based on stored event data in accordance with some embodiments.

FIG. 6 is a flow diagram showing an example of a process for computing cardinality values based on stored event data in accordance with some embodiments. In some embodiments, process 600 is implemented at a dynamic video correlation determination server such as dynamic video correlation determination server 104 of system 100 of FIG. 1.

Process 600 describes an example process for computing various cardinality values based on video interaction events and product interaction events derived from a new set of recorded user online activity data and that are stored in the database. In process 600, each "cardinality" refers to a number of distinct panelist IDs (i.e., a number of distinct/ unique users) that are included in at least a subset of interaction events that are stored in the database. While process 600 describes the computation of six different types of cardinalities, in actual implementation, more, fewer, or at least some different types of cardinalities can be computed based on the interaction events stored in the database.

At 602, video creator ID cardinalities corresponding to a new set of recorded user online activity data are determined and stored. A "video creator ID cardinality" corresponding to a particular video creator ID refers to the number of distinct panelist IDs that have each performed at least one video interaction event with respect to a video that is associated with that video creator ID. In one specific example process to determine the video creator ID cardinality corresponding to Video Creator ID "CoffeeKeen," the entries/rows of the database table (e.g., a table such as table 500 of FIG. 5) are iterated through and for each video interaction event that includes "CoffeeKeen" under the Creator ID field column also includes a new panelist ID value relative to a previously tracked panelist ID value, and a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter comprising the video creator ID cardinality corresponding to Video Creator ID "CoffeeKeen" by detecting a currently checked video interaction event that includes "CoffeeKeen" under the Creator ID field column and also includes a new panelist ID value relative to a previously tracked panelist ID value.

In the event that the database is distributed and the database table is sharded across more than one storage node, the respective video creator ID cardinalities corresponding to Video Creator ID "CoffeeKeen" that are locally determined at each storage node can be summed together to arrive at the total video creator ID cardinality corresponding to Video Creator ID "CoffeeKeen" (i.e., the number of distinct panelist IDs that have each performed at least one video interaction event, stored at any storage node, with respect to a video that is associated with that video creator ID). As mentioned above, because entries/rows pertaining to the same panelist ID are stored at the same storage node, the respective video creator ID cardinalities corresponding to Video Creator ID "CoffeeKeen" that are locally computed at different storage nodes do not include overlapping panelist IDs and therefore, do not need to be deduplicated before they are summed up.

The example process for determining a video creator ID cardinality described above can be repeated for each distinct/unique video creator ID that is currently included in the database table such that, as a result, a corresponding video creator ID cardinality can be determined and stored/cached for each distinct/unique video creator ID.

At 604, video category TD cardinalities corresponding to the new set of recorded user online activity data are determined and stored. A "video category ID cardinality" corresponding to a particular video category ID refers to the number of distinct panelist IDs that have each performed at least one video interaction event with respect to a video that is associated with that video category ID. In one specific example process to determine the video category ID cardinality corresponding to Video Category ID "Food & Drink/ Drinks/Coffee," the entries/rows of the database table (e.g., a table such as table 500 of FIG. 5) are iterated through and for each video interaction event that includes "Food &

Drink/Drinks/Coffee" under the video category ID field column also includes a new panelist ID value relative to a previously tracked panelist ID value, and a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter comprising the video category ID cardinality corresponding to Video Category ID "Food & Drink/Drinks/Coffee" by detecting a currently checked video interaction event that includes "Food & Drink/Drinks/Coffee" under the Video Category ID field column and also includes a new panelist ID value relative to a previously tracked panelist ID value.

In the event that the database is distributed and the database table is sharded across more than one storage node, the respective video category ID cardinalities corresponding to Video Category ID "Food & Drink/Drinks/Coffee" that are locally determined at each storage node can be summed together to arrive at the total video category ID cardinality corresponding to Video Category ID "Food & Drink/Drinks/Coffee" (i.e., the number of distinct panelist IDs that have each performed at least one video interaction event, stored at any storage node, with respect to a video that is associated with that video category ID). As mentioned above, because entries/rows pertaining to the same panelist ID are stored at the same storage node, the respective video category ID cardinalities corresponding to Video Category ID "Food & Drink/Drinks/Coffee" that are locally computed at different storage nodes do not include overlapping panelist IDs and therefore, do not need to be deduplicated before they are summed up.

The example process for determining a video category ID cardinality described above can be repeated for each distinct/unique video category ID that is currently included in the database table such that, as a result, a corresponding video category ID cardinality can be determined and stored/cached for each distinct/unique video category ID.

At 606, brand ID cardinalities corresponding to the new set of recorded user online activity data are determined and stored. A "brand ID cardinality" corresponding to a particular brand ID refers to the number of distinct panelist IDs that have each performed at least one product interaction event with respect to a product that is associated with that brand ID. In one specific example process to determine the brand ID cardinality corresponding to Brand ID "BevCafe," the entries/rows of the database table (e.g., a table such as table 500 of FIG. 5) are iterated through and for each product interaction event that includes "BevCafe" under the brand ID field column and also includes a new panelist ID value relative to a previously tracked panelist ID value, a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter comprising the brand ID cardinality corresponding to Brand ID "BevCafe" by detecting a currently checked product interaction event that includes "BevCafe" under the Brand ID field column and also includes a new panelist ID value relative to a previously tracked panelist ID value.

In the event that the database is distributed and the database table is sharded across more than one storage node, the respective brand ID cardinalities corresponding to Brand ID "BevCafe" that are locally determined at each storage node can be summed together to arrive at the total brand ID cardinality corresponding to Brand ID "BevCafe" (i.e., the number of distinct panelist IDs that have each performed at least one product interaction event, stored at any storage node, with respect to a product that is associated with that brand ID). As mentioned above, because entries/rows pertaining to the same panelist ID are stored at the same storage node, the respective brand ID cardinalities corresponding to Brand ID "BevCafe" that are locally computed at different storage nodes do not include overlapping panelist IDs and therefore, do not need to be deduplicated before they are summed up.

The example process for determining a brand ID cardinality described above can be repeated for each distinct/unique brand ID that is currently included in the database table such that, as a result, a corresponding brand ID cardinality can be determined and stored/cached for each distinct/unique brand ID.

At 608, product ID cardinalities corresponding to the new set of recorded user online activity data are determined and stored. A "product ID cardinality" corresponding to a particular product ID refers to the number of distinct panelist IDs that have each performed at least one product interaction event with respect to a product that is associated with that product ID. In one specific example process to determine the product ID cardinality corresponding to Product ID "Aroma Blend," the entries/rows of the database table (e.g., a table such as table 500 of FIG. 5) are iterated through and for each product interaction event that includes "Aroma Blend" under the product ID field column also includes a new panelist ID value relative to a previously tracked panelist ID value, and a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter comprising the product ID cardinality corresponding to Product ID "Aroma Blend" by detecting a currently checked product interaction event that includes "Aroma Blend" under the Product ID field column and also includes a new panelist ID value relative to a previously tracked panelist ID value.

In the event that the database is distributed and the database table is sharded across more than one storage node, the respective product ID cardinalities corresponding to Product ID "Aroma Blend" that are locally determined at each storage node can be summed together to arrive at the total product ID cardinality corresponding to Product ID "Aroma Blend" (i.e., the number of distinct panelist IDs that have each performed at least one product interaction event, stored at any storage node, with respect to a product that is associated with that product ID). As mentioned above, because entries/rows pertaining to the same panelist ID are stored at the same storage node, the respective product ID cardinalities corresponding to Product ID "Aroma Blend" that are locally computed at different storage nodes do not include overlapping panelist IDs and therefore, do not need to be deduplicated before they are summed up.

The example process for determining a product ID cardinality described above can be repeated for each distinct/unique product ID that is currently included in the database table such that, as a result, a corresponding product ID cardinality can be determined and stored/cached for each distinct/unique product ID.

At 610, product category ID cardinalities corresponding to the new set of recorded user online activity data are determined and stored. A "product category ID cardinality" corresponding to a particular product category ID refers to the number of distinct panelist IDs that have each performed at least one product interaction event with respect to the product that is associated with that product category ID. In one specific example process to determine the product category ID cardinality corresponding to Product Category ID "Food Service Equipment & Supplies," the entries/rows of the database table (e.g., a table such as table 500 of FIG. 5) are iterated through and for each product interaction event that includes "Food Service Equipment & Supplies" under the product category ID field column also includes a new panelist ID value relative to a previously tracked panelist ID value, and a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter comprising the product category ID cardinality corresponding to Product Category ID "Food Service Equipment & Supplies" by detecting a currently checked product interaction event that includes "Food Service Equipment & Supplies" under the Product Category ID field column and also includes a new panelist ID value relative to a previously tracked panelist ID value.

In the event that the database is distributed and the database table is sharded across more than one storage node, the respective product category ID cardinalities corresponding to Product Category ID "Food Service Equipment & Supplies" that are locally determined at each storage node can be summed together to arrive at the total product category ID cardinality corresponding to Product Category ID "Food Service Equipment & Supplies" (i.e., the number of distinct panelist IDs that have each performed at least one product interaction event, stored at any storage node, with respect to a product that is associated with that product category ID). As mentioned above, because entries/rows pertaining to the same panelist ID are stored at the same storage node, the respective product category ID cardinalities corresponding to Product Category ID "Food Service Equipment & Supplies" that are locally computed at different storage nodes do not include overlapping panelist IDs and therefore, do not need to be deduplicated before they are summed up.

The example process for determining a product category ID cardinality described above can be repeated for each distinct/unique product category ID that is currently included in the database table such that, as a result, a corresponding product category ID cardinality can be determined and stored/cached for each distinct/unique product category ID.

At 612, a video panelist ID cardinality corresponding to the new set of recorded user online activity data is determined and stored. The "video panelist ID cardinality" refers to the number of distinct panelist IDs that have each performed any video interaction event in the database table. Put another way, the "video panelist ID cardinality" refers the total number of unique panelist IDs/users that have interacted with any video across the events stored in the database table. In one specific example process to determine the video panelist ID cardinality in the database table, the entries/rows of the database table (e.g., a table such as table 500 of FIG. 5) are iterated through and for each video interaction event that includes a new panelist ID value relative to a previously tracked panelist ID value, a counter can be incremented by one. As mentioned above, because the database table has already been sorted by panelist IDs, the entries/rows of the table can be iterated through without needing to keep track of which distinct panelist ID values have been counted and which have not and instead, the iterative process can simply increment the counter corresponding to the video panelist ID cardinality by detecting any video interaction event that includes a new panelist ID value relative to a previously tracked panelist ID value.

In the event that the database is distributed and the database table is sharded across more than one storage node, the respective video panelist ID cardinalities that are locally determined at each storage node can be summed together to arrive at the total panelist ID cardinality (i.e., the number of distinct panelist IDs that have each performed a video interaction event, stored at any storage node, with respect to any video). As mentioned above, because entries/rows pertaining to the same panelist ID are stored at the same storage node, the respective video panelist ID cardinalities that are locally computed at different storage nodes do not include overlapping panelist IDs and therefore, do not need to be deduplicated before they are summed up.

In some embodiments, alternative to process 600, at least some cardinality values need not be computed prior to receiving a request for correlation values. Instead, a respective statistical counting structure (e.g., HyperLogLog) can be computed for each possible video grouping (e.g., video ID, video creator ID, video category ID) and for each possible non-video grouping in advance of receiving the request. Then, after the request is received, the relevant statistical counting structures can be retrieved from storage to quickly estimate the cardinality values that are relevant to the request by determining unions and intersections using the statistical counting structures without needing to (in real-time) process raw event data, which would be computationally more expensive at query time. For example, prior to receiving the request, a respective statistical counting structure (e.g., HyperLogLog) can be computed for each possible video grouping (e.g., video ID, video creator ID, video category ID) based on the panelist IDs that are associated with video interactions corresponding to that video grouping. Then, after a request for correlation values corresponding to a particular video grouping is received, that video grouping's statistical counting structure can be retrieved from storage and used to estimate the cardinality value (e.g., the number of distinct panelist IDs that have performed video interactions) associated with that particular video grouping. A benefit of using pre-computed statistical counting structures at query time is that arbitrary groupings can be made to create a richer set of insights without needing to have anticipated, and therefore pre-computed those groupings. For example, prior to query time, statistical counting structures had been computed at the video level. With fast union operations made possible using the statistical counting structures, an arbitrary new grouping can be determined at query/run time to include, for example, all the videos that mention a certain brand name that were part of a given advertising campaign. This would allow the requesting user to analyze the correlation of the advertising campaign as a whole (that is, all videos in the campaign as single entity) without the system having had to a) anticipate that video grouping would be needed and in turn b) precompute the statistical counting structure for that campaign grouping.

Figure 7:
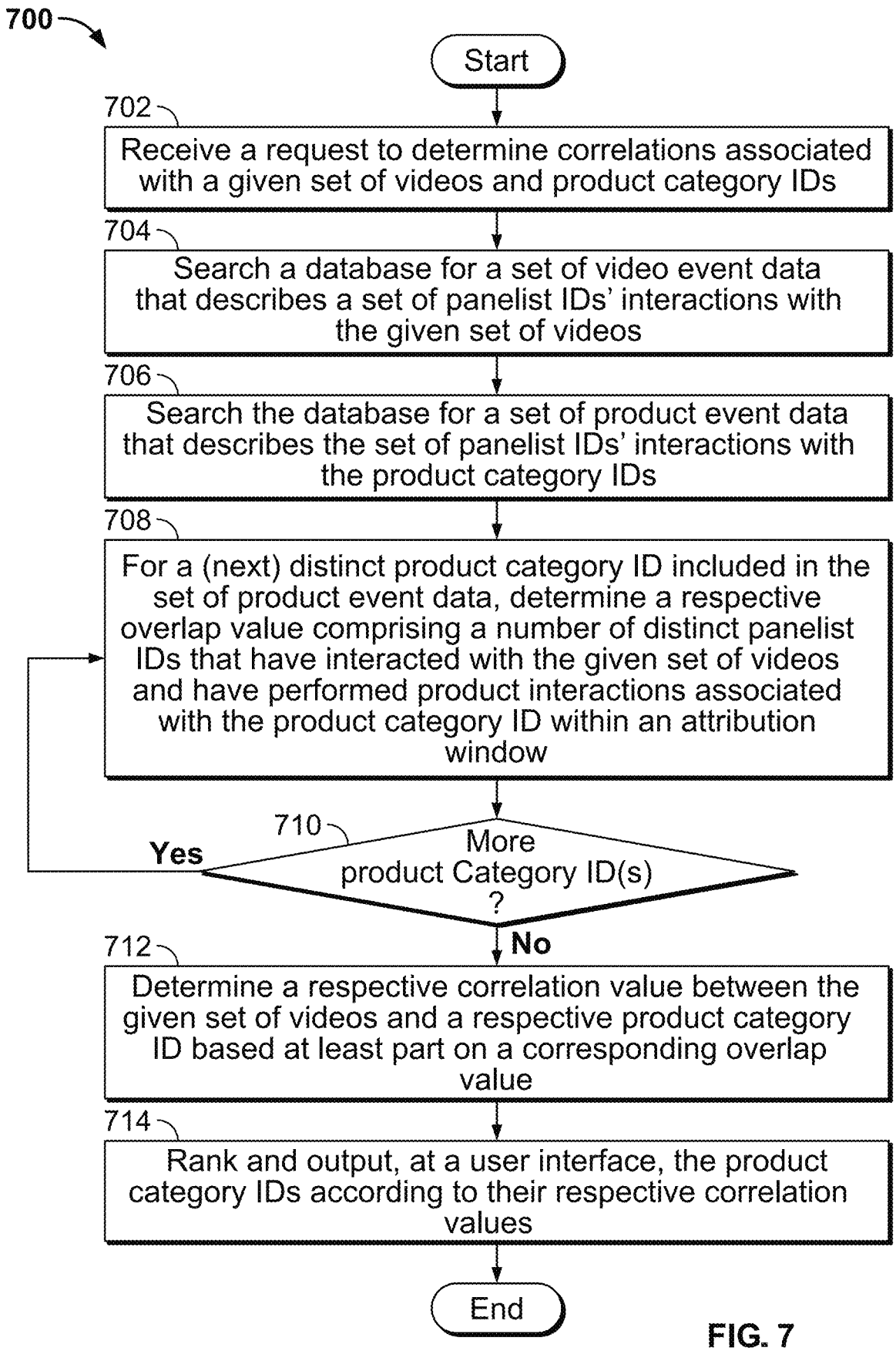
FIG. 7 is a flow diagram showing an example of a process for computing correlation values between a given set of videos and product category IDs in accordance with some embodiments.
Figure 8:
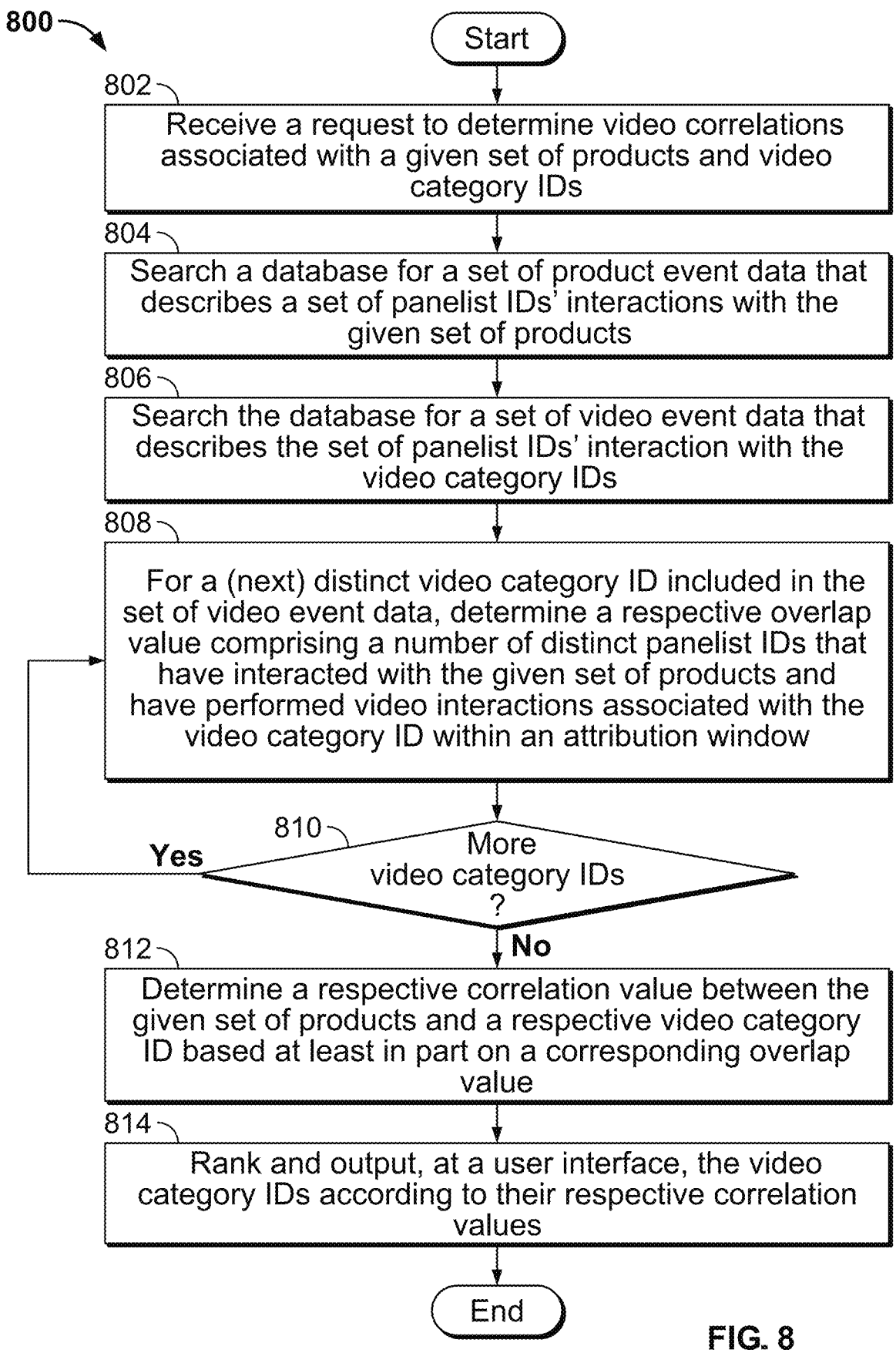
FIG. 8 is a flow diagram showing an example of a process for computing correlation values between a given set of products and video category IDs in accordance with some embodiments.

FIGS. 7 and 8, below, describe example processes for determining correlation values between video groupings and product groupings based on searching for interaction events stored at the database that may be attributable to each other by having occurred within an attribution time window. The use of the configurable attribution time window to constrain the search for video and product searches in the database provides an adjustable temporal link to find potentially related or correlated events.

FIG. 7 is a flow diagram showing an example of a process for computing correlation values between a given set of videos and product category IDs in accordance with some embodiments. In some embodiments, process 700 is implemented at a dynamic video correlation determination server such as dynamic video correlation determination server 104 of system 100 of FIG. 1. In some embodiments, step 308 of process 300 of FIG. 3 may be implemented, at least in part, by process 700.

While example process 700 describes one example technique of determining a respective correlation value between a given set of videos and each product category ID, the same example process can be used to determine a respective correlation value between a given set of videos and each of another type of product grouping (e.g., product ID or brand ID) and in which case each instance of "product category ID" below in process 700 can be replaced with the other type of product grouping (e.g., product ID or brand ID).

At 702, a request to determine correlations associated with a given set of videos and product category IDs is received. In some embodiments, the request can identify a set of videos using video identifying information comprising a video category ID, a video creator ID, or other attribute(s) that describe videos. Videos (as determined by their video IDs) that are determined to match the provided video identifying information are referred to in process 700 as the "given set of videos." In some embodiments, the request can be received via a webpage that includes a user interface at which a user can first select to obtain correlation values between a set of videos and product categories and then submit the video identifying information.

At 704, a database is searched for a set of video event data that describes a set of panelist IDs' interactions with the given set of videos. A (e.g., distributed) database that stores video interaction events and product interaction events (e.g., table 500 of FIG. 5) can be queried for matching video interaction events that each include at least one video ID that is included in the given set of videos.

At 706, the database is searched for a set of product event data that describes the set of panelist IDs' interactions with the product category IDs. Then, for each distinct panelist ID value that is included in the matching video interaction events, a set of product interaction events (pertaining to any product category ID) that includes the same panelist ID value is found in the database.

At 708, for a (next) distinct product category ID included in the set of product event data, determine a respective overlap value comprising a number of distinct panelist IDs that have interacted with the given set of videos and have performed product interactions associated with the product category ID within an attribution window. The "attribution window" (or sometimes referred to as the "attribution time window") refers to a window of time that if a product interaction event and a video interaction event have respective timestamps that are within that window of time, then the product interaction event and the video interaction event may be attributed to each other. In some embodiments, the attribution time window is of a configurable length of time. In one specific example, the attribution time window is 30 days. In some embodiments, the product interaction event and the video interaction event are determined to be attributed to each other only if the product interaction event had occurred before the video interaction event within the window. In some other embodiments, the product interaction event and the video interaction event are determined to be attributed to each other regardless of the sequence of their occurrences within the window.

The "overlap value" corresponding to the given set of videos and each distinct product category ID can be determined as the number of distinct panelist IDs that have each performed both at least one video interaction event (that includes a video ID in the given set of videos) and at least one product interaction event (that includes the product category ID) (e.g., within the attribution time window of each other).

One specific example technique to determine the "overlap value" corresponding to the given set of videos associated with the Video Creator ID of "CoffeeKeen" and Product Category ID "Food Service Equipment & Supplies" can be determined by incrementing a counter for each distinct panelist ID value that was 1) included in a matching video interaction event, 2) included in a product interaction event associated with Product Category ID "Food Service Equipment & Supplies," and 3) the matching video interaction event and that product interaction event had occurred within the attribution time window of each other. As mentioned above, because all the interaction events are sorted by panelist IDs in the database table, events related to the same panelist ID can be efficiently searched given that the entries/rows are already located close to each other in the table. Also, as mentioned above, because entries/rows pertaining to the same panelist ID are stored at the same storage node (where the database table is sharded across more than one storage node), the respective overlap values between a given set of videos and a particular product category ID that are locally computed/counted at different storage nodes do not include overlapping panelist IDs and therefore, do not need to be deduplicated before they are summed up.

Another specific example technique to determine the "overlap value" corresponding to the given set of videos associated with the Video Creator ID of "CoffeeKeen" and Product Category ID "Food Service Equipment & Supplies" can be determined using the statistical counting data structures (e.g., HyperLogLog) corresponding to the Video Creator ID of "CoffeeKeen" and Product Category ID "Food Service Equipment & Supplies." For example, the statistical counting data structure corresponding to the Video Creator ID of "CoffeeKeen" can be derived by populating a data structure with hash values generated from panelist IDs in the database table that have had video interactions associated with "CoffeeKeen" and where that data structure can be stored to represent the number of distinct panelist IDs associated with "CoffeeKeen." Also, for example, the statistical counting data structure corresponding to the Product Category ID "Food Service Equipment & Supplies" can be derived by populating a data structure with hash values generated from panelist IDs in the database table that have had product interactions associated with "Food Service Equipment & Supplies" and where that data structure can be cached to represent the number of distinct panelist IDs associated with "Food Service Equipment & Supplies." To determine the overlap between "CoffeeKeen" and "Food Service Equipment & Supplies" after a request for correlation values between "CoffeeKeen" and "Food Service Equipment & Supplies" was received, their respective statistical counting data structures can be retrieved and used to efficiently compute an intersection of panelist IDs between the two sets, which forms the number of unique panelist IDs that have been both performed video interactions associated with the Video Creator ID of "CoffeeKeen" and also performed product interactions associated with the Product Category ID of "Food Service Equipment & Supplies." However, this particular technique of determining the overlap using statistical computing data structures does not account for the attribution window between video and product events and would therefore yield a different overlap value than the technique of counting database rows as described above.

At 710, whether there is at least one more distinct product category ID for which to determine a respective overlap value is determined. In the event that there is at least one more distinct product category ID for which to determine a respective overlap value, control is returned to 708. Otherwise, in the event that there are no more distinct product category IDs for which to determine a respective overlap value, control is transferred to 712. Step 708 is repeated until a respective "overlap value" is computed between each pair of the given set of videos and a distinct product category ID.

At 712, a respective correlation value is determined between the given set of videos and a respective product category ID based at least in part on a corresponding overlap value. One or more types of correlation values are determined between each pair including the given set of videos and a distinct product category ID based on the corresponding dynamically determined "overlap value" and one or more cardinality values. In some embodiments, the cardinality values were computed and stored using a process such as process 600 prior to receipt of the request at step 702. In some embodiments, the cardinality values were computed in real-time using cached statistical counting structures corresponding to the given set of videos and a respective product category ID. Examples of types of "correlation values" include an affinity, a market share, a relevance, and an audience share. Examples of computing different types of correlation values are described with FIG. 10, below.

At 714, the product category IDs are ranked and outputted according to their respective correlation values at a user interface. The product category IDs can be sorted/ranked along one type of correlation value and then at least a portion of this ranked order of product category IDs can be presented at a user interface (e.g., that is provided at a webpage). By presenting the ranked list of product category IDs at a user interface, the product categories with the strongest correlations to the lowest correlations to the given set of videos can be exposed to the user.

FIG. 8 is a flow diagram showing an example of a process for computing correlation values between a given set of products and video category IDs in accordance with some embodiments. In some embodiments, process 800 is implemented at a dynamic video correlation determination server such as dynamic video correlation determination server 104 of system 100 of FIG. 1. In some embodiments, step 308 of process 300 of FIG. 3 may be implemented, at least in part, by process 800.

While example process 800 describes one example technique of determining a respective correlation value between a given set of products and each video category ID, the same example process can be used to determine a respective correlation value between a given set of products and each of another type of video grouping (e.g., video ID or video creator ID) and in which case each instance of "video category ID" below in process 800 can be replaced with the other type of video grouping (e.g., video ID or video creator ID).

At 802, a request to determine correlations associated with a given set of products and video category IDs is received. In some embodiments, the request can identify a set of products using product identifying information comprising a product category ID, a brand ID, or other attribute(s) that describe products. Products (as determined by their product IDs) that are determined to match the provided product identifying information are referred to in process 800 as the "given set of products." In some embodiments, the request can be received via a webpage that includes a user interface at which a user can first select to obtain correlation values between a set of products and video categories and then submit the product identifying information.

At 804, a database is searched for a set of product event data that describes a set of panelist IDs' interactions with the given set of products. A (e.g., distributed) database that stores product interaction events and event interaction events (e.g., table 500 of FIG. 5) can be queried for matching product interaction events that each include at least one product ID that is included in the given set of products.

At 806, the database is searched for a set of video event data that describes the set of panelist IDs' interactions with the video category IDs. Then, for each distinct panelist ID value that is included in the matching product interaction events, a set of video interaction events (pertaining to any video category ID) that includes the same panelist ID value is found in the database.

At 808, for a (next) distinct video category ID included in the set of video event data, determine a respective overlap value comprising a number of distinct panelist IDs that have interacted with the given set of products and have performed video interactions associated with the video category ID within an attribution window. The "attribution window" (or sometimes referred to as the "attribution time window") refers to a window of time that if a video interaction event and a product interaction event have respective timestamps that are within that window of time, then the video interaction event and the product interaction event may be attributed to each other. In some embodiments, the attribution time window is of a configurable length of time. In one specific example, the attribution time window is 30 days. In some embodiments, the video interaction event and the product interaction event are determined to be attributed to each other only if the video interaction event had occurred before the product interaction event within the window. In some other embodiments, the video interaction event and the product interaction event are determined to be attributed to each other regardless of the sequence of their occurrence within the window.

The "overlap value" corresponding to the given set of products and each distinct video category ID can be determined as the number of distinct panelist ID values that have each performed both at least one product interaction event (that includes a product ID in the given set of videos) and at least one video interaction event (that includes the video category ID) within the attribution time window of each other.

One specific example technique to determine the "overlap value" corresponding to the given set of products associated with the product ID of "Aroma Blend" and Video Category ID "Food & Drink/Drinks/Coffee" can be determined by incrementing a counter for each distinct panelist ID value that was 1) included in a matching product interaction event, 2) included in a video interaction event associated with video category ID "Food & Drink/Drinks/Coffee," and 3) the matching video interaction event and that product interaction event had occurred within the attribution time window of each other. As mentioned above, because all the interaction events are sorted by panelist IDs in the database table, events related to the same panelist ID can be efficiently searched given that the entries/rows are already located close to each other in the table. Also, as mentioned above, because entries/rows pertaining to the same panelist ID are stored at the same storage node (where the database table is sharded across more than one storage node), the respective overlap values between a given set of videos and a particular product category ID that are locally computed at different storage nodes do not include overlapping panelist IDs and therefore, do not need to be deduplicated before they are summed up.

Another specific example technique to determine the "overlap value" corresponding to the given set of products associated with the product ID of "Aroma Blend" and video category ID "Food & Drink/Drinks/Coffee" can be determined using the statistical counting data structures (e.g., HyperLogLog) corresponding to the product ID of "Aroma Blend" and video category ID "Food & Drink/Drinks/Coffee." For example, the statistical counting data structure corresponding to the product ID of "Aroma Blend" can be derived by populating a data structure with hash values generated from panelist IDs in the database table that have had product interactions (e.g., visited webpages, made online purchases, placed in virtual carts) associated with the "Aroma Blend" product ID and where that data structure can be stored to represent the number of distinct panelist IDs associated with "Aroma Blend." Also, for example, the statistical counting data structure corresponding to the video category ID "Food & Drink/Drinks/Coffee" can be derived by populating a data structure with hash values generated from panelist IDs in the database table that have had video interactions associated with "Food & Drink/Drinks/Coffee" and where that data structure can be cached to represent the number of distinct panelist IDs associated with "Food & Drink/Drinks/Coffee." To determine the overlap between the panelist IDs who have interacted with the "Aroma Blend" product ID and the panelist IDs who have interacted with a video associated with "Food & Drink/Drinks/Coffee" video category ID after a request for correlation values between "Aroma Blend" and "Food & Drink/Drinks/Coffee" was received, their respective statistical counting data structures can be retrieved and used to efficiently compute an intersection of panelist IDs between the two sets, which forms the number of unique panelist IDs that have been both performed product interactions associated with "Aroma Blend" and also performed video interactions associated with "Food & Drink/Drinks/Coffee."

At 810, whether there is at least one more distinct video category ID for which to determine a respective overlap value is determined. In the event that there is at least one more distinct video category ID for which to determine a respective overlap value, control is returned to 808. Otherwise, in the event that there are no more distinct video category IDs for which to determine a respective overlap value, control is transferred to 812. Step 808 is repeated until a respective "overlap value" is computed between each pair of the given set of products and a distinct video category ID.

At 812, a respective correlation value is determined between the given set of products and a respective video category ID based at least in part on a corresponding overlap value. One or more types of correlation values are determined between each pair including the given set of products and a distinct video category ID based on the corresponding dynamically determined "overlap value" and one or more cardinality values (e.g., that were computed using a process such as process 600 prior to receipt of the request at step 802 and stored). Examples of types of "correlation values" include an affinity, a market share, a relevance, and an audience share. Examples of computing different types of correlation values are described with FIG. 10, below.

At 814, the video category IDs are ranked and outputted according to their respective correlation values at a user interface. The video category IDs can be sorted/ranked along one type of correlation value and then at least a portion of this ranked order of video category IDs can be presented at a user interface (e.g., that is provided at a webpage). By presenting the ranked list of video category IDs at a user interface, the video categories with the strongest correlations to the lowest correlations to the given set of products can be exposed to the user.

Figure 9:
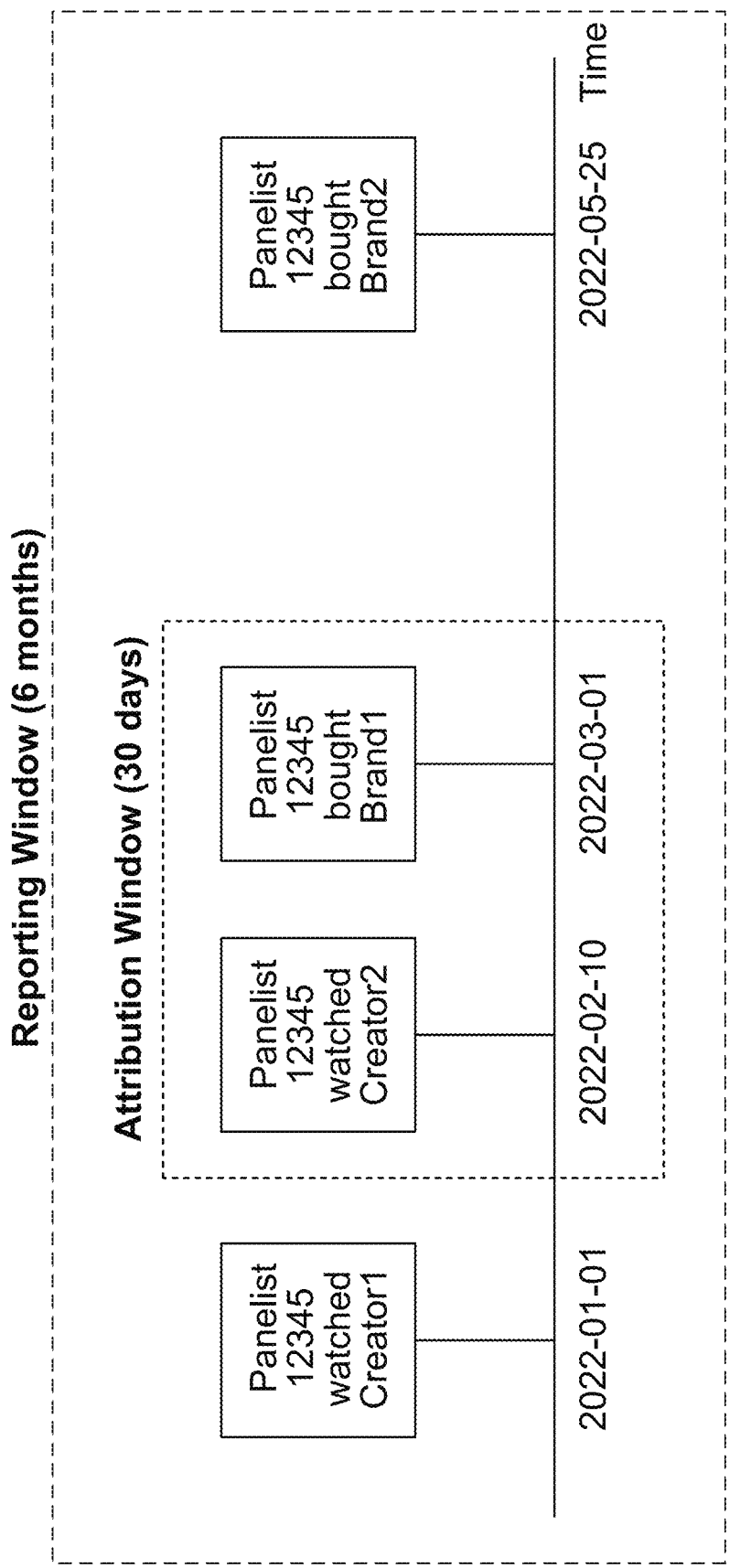
FIG. 9 is a diagram showing an example of an attribution time window being applied to recorded interaction events associated with the same panelist ID in accordance with some embodiments.

FIG. 9 is a diagram showing an example of an attribution time window being applied to recorded interaction events associated with the same panelist ID in accordance with some embodiments. The timeline of FIG. 9 shows the following four interaction events that have been performed by Panelist ID "12345" in the chronological order in which the events had occurred: Panelist ID "12345" watched a video by Video Creator ID "Creator1" on 2022-01-01; Panelist ID "12345" watched a video by Video Creator ID "Creator2" on 2022-02-10; Panelist ID "12345" bought a product associated with Brand ID "Brand1" on 2022-03-01; and Panelist ID "12345" bought a product associated with Brand ID "Brand2" on 2022-05-25. Assuming that the event of Panelist ID "12345" watched a video by Video Creator ID "Creator2" on 2022-02-10 is a matching video interaction event in response to a request to determine correlations associated with a given set of videos associated with Video Creator ID "Creator2" and Brand ID "Brand1" (e.g., in a process such as process 700), it would be determined that Panelist ID "12345" had performed a product interaction event (Panelist ID "12345" bought a product associated with Brand ID "Brand1" on 2022-03-01) that was within the example 30 day attribution time window of the matching video interaction. As such, in the example of FIG. 9 and for a request to determine correlations associated with a given set of videos associated with Video Creator ID "Creator2" and Brand ID "Brand1," Panelist ID "12345" would be included in the overlap value between Video Creator ID "Creator2" and Brand ID "Brand1" (i.e., Panelist ID "12345" would be included in the count of distinct panelist ID values that watched a video by "Creator2" and had performed a product interaction associated with "Brand1" within the attribution time window). As described in process 700 of FIG. 7, this overlap value between Video Creator ID "Creator2" and Brand ID "Brand1" will be used to determine one or more types of correlation values between Video Creator ID "Creator2" and Brand ID "Brand1."

Figure 10:
FIG. 10 is a Venn diagram showing a visual representation of groups of panelist IDs associated with different subsets of recorded interaction events in accordance with some embodiments.

FIG. 10 is a Venn diagram showing a visual representation of groups of panelist IDs associated with different subsets of recorded interaction events in accordance with some embodiments. The Venn diagram of FIG. 10 can be referred to compute the following types of correlation values between videos associated with Creator "Creator1" and products belonging to Brand ID "Brand1": affinity, market share, audience share, and relevance. For example, one or more of these types of correlation values may be computed in response to a request for correlation values between videos created by "Creator1" (e.g., in a process such as process 700 of FIG. 7) and products associated with brand IDs. The following are example formulae to be used to determine each type of correlation value between videos associated with Creator "Creator1" and products belonging to Brand ID "Brand1" with reference to relevant portions of the Venn diagram shown in FIG. 10:

$$\text{Affinity} = \frac{\frac{\text{Overlap Value}}{\text{Creator1 Cardinality}}}{\frac{\text{Brand1 Cardinality}}{\text{Video Panelist, ID Cardinality}}} \quad (1)$$

$$\text{Market Share} = \frac{\text{Overlap Value}}{\text{Brand1 Cardinality}} \quad (2)$$

$$\text{Relevance} = \text{Affinity} * \text{Market Share} \quad (3)$$

$$\text{Audience Share} = \frac{\text{Overlap Value}}{\text{Creator1 Cardinality}} \quad (4)$$

"Overlap value" refers to the number of distinct panelist IDs, in the database table, that have both watched with a video created by "Creator1" and also bought a product associated with "Brand1" within an attribution time window. This overlap value can be dynamically determined in response to a request for correlation values between videos created by "Creator1" and products associated with each brand ID (e.g., such as identified in a request received in a process such as process 700 of FIG. 7). For example, as described in the example of process 700 in FIG. 7 above, this overlap value can be dynamically determined by iterating through rows in the database table or by using pre-computed statistical counting data structures (e.g., HyperLogLog) corresponding to "Creator1" and "Brand1." As mentioned above, the overlap value that is determined using pre-computed statistical counting structures (e.g., such as HyperLogLog would not be able to account for an attribution window between product and video events).

"Creator1 Cardinality" refers to the number of distinct panelist IDs, in the database table, that have watched any videos created by "Creator1." In some embodiments, this cardinality value can be computed and stored (e.g., using a process such as process 600 of FIG. 6) prior to receiving the request for correlation values between videos created by "Creator1" and products associated with brand IDs. In some other embodiments, this cardinality value can be dynamically estimated using the pre-computed statistical counting data structure (e.g., HyperLogLog) corresponding to "Creator1."

"Brand1 Cardinality" refers to the number of distinct panelist IDs, in the database table, that have bought any products associated with "Brand1." In some embodiments, this cardinality value can be computed and stored (e.g., using a process such as process 600 of FIG. 6) prior to receiving the request for correlation values between videos created by "Creator1" and products associated with brand IDs. In some other embodiments, this cardinality value can be dynamically estimated using the pre-computed statistical counting data structure (e.g., HyperLogLog) corresponding to "Brand1."

"Video Panelist ID Cardinality" refers to the number of distinct panelist IDs, in the database table, that have watched any videos. In some embodiments, this cardinality value can be computed and stored (e.g., using a process such as process 600 of FIG. 6) prior to receiving the request for correlation values between videos created by "Creator1" and products associated with brand IDs.

As shown in the example of FIG. 10, each of various types of correlation values between videos associated with "Creator1" and products associated with "Brand1" can be computed based on one dynamically computed "overlap value" and also one or more pre-computed/cached cardinality values (or dynamically estimated cardinality values). As such, each type of correlation value between videos associated with "Creator1" and each of brands such as "Brand1" can be quickly computed, in real-time, in response to a request for correlation values between videos created by "Creator1" and products associated with brand IDs. In some embodiments, each correlation value between videos created by "Creator1" and products associated with brand IDs can also be cached and retrieved in response to a subsequent request.

Figure 11:
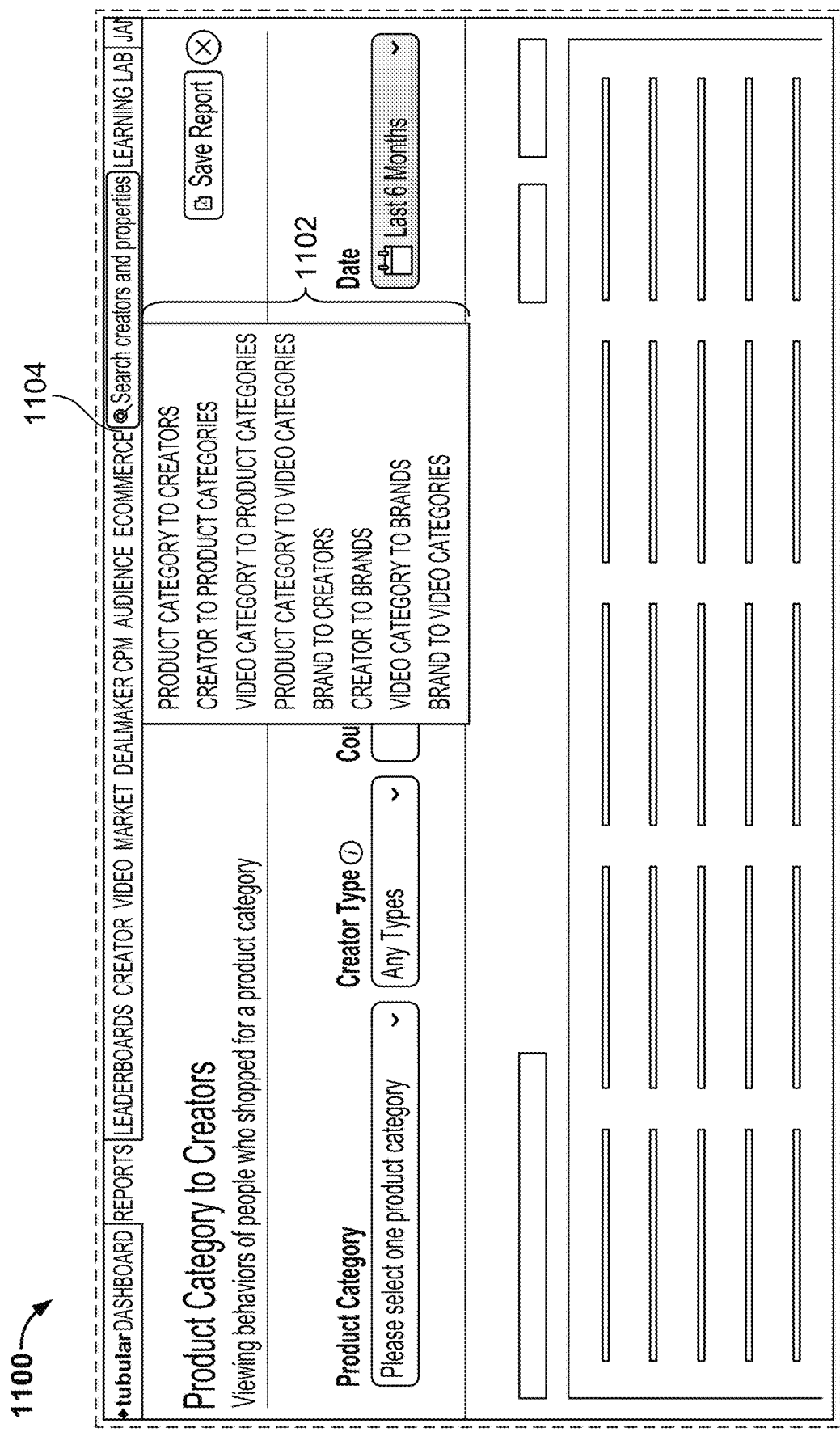
FIG. 11 is a diagram showing an example user interface that shows a dropdown menu of possible types of requests for correlation values in accordance with some embodiments.

FIG. 11 is a diagram showing an example user interface that shows a dropdown menu of possible types of requests for correlation values in accordance with some embodiments. As shown in user interface 1100, a user can select tab 1104 to view dropdown menu 1102 of requests for correlation values. As shown in dropdown menu 1102, the requests for correlation values can be between product category to creators, creator to product categories, video category to product categories, product category to video categories, brand to creators, creator to brands, video category to brands, and brand to video categories. In response to a user selection of one type of request from dropdown menu 1102, user interface 1100 updates to allow the user to further specify identifying information associated with a particular instance/ID of the former video or product grouping in the selected type of request. Then, the request for correlation values between the set of products or videos associated with the specified identifying information and latter grouping in the selected type of request is dynamically processed to generate correlation values.

Figure 12:
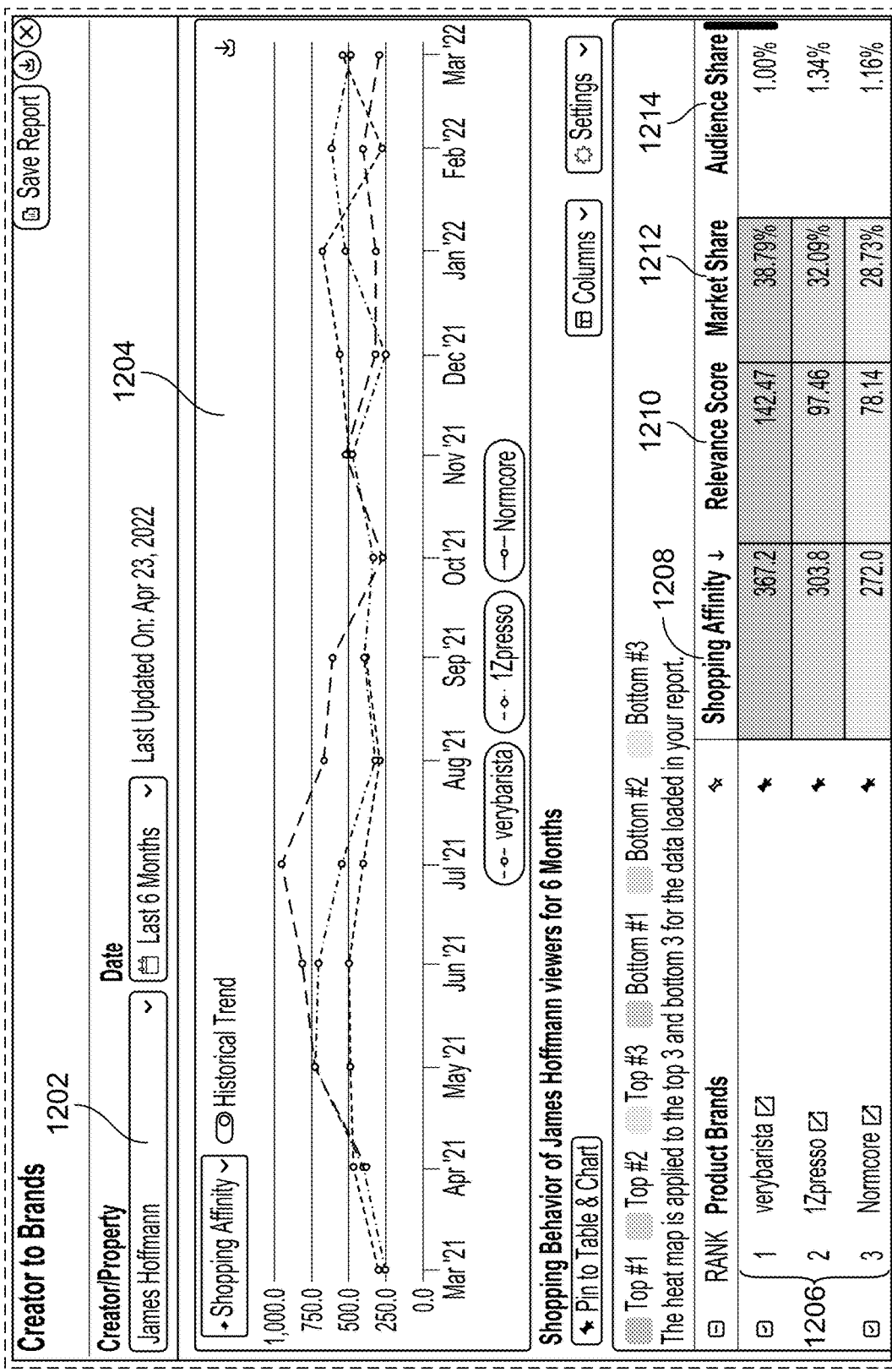
FIG. 12 is a diagram showing an example user interface that shows correlation values between a specified creator ID and brand IDs in accordance with some embodiments.

FIG. 12 is a diagram showing an example user interface that shows correlation values between a specified creator ID and brand IDs in accordance with some embodiments. For example, user interface 1200 is generated after a user had selected the creator to brand IDs type of request in dropdown menu 1102 in user interface 1100 of FIG. 1 and then selected "James Hoffman" as the particular creator/property in dropdown menu 1202 whose videos for which correlation values will be determined with each of various brand IDs. For example, a process such as process 700 of FIG. 7 can be performed to generate correlation values between the videos associated with creator "James Hoffman" and each of various brand IDs. In the example of user interface 1200, between the videos associated with creator "James Hoffman" and each of various brand IDs, four correlation values were determined: Shopping Affinity, Relevance Score, Market Share, and Audience Share. Section 1206 shows a portion of the list of brand IDs that are ranked by their respective correlation values (Shopping Affinity) to creator "James Hoffman." Furthermore, the three top ranked brand IDs of "verybarista," "1Zpresso," and "Normcore" were selected to have their respective historical Shopping Affinities relative to creator "James Hoffman" be plotted across different points in time in the last 12 months in plot 1204. Each of Shopping Affinity 1208, Relevance Score 1210, Market Share 1212, and Audience Share 1214 between videos associated with creator "James Hoffman" and a brand ID can be determined based on the example formulae described in FIG. 10, above, for affinity, relevance, market share, and audience share, respectively. The brand IDs in section 1206 can be ranked by another correlation value (e.g., Relevance Score 1210, Market Share 1212, and Audience Share 1214) in response to a user selection of one such other correlation value.

Figure 13:
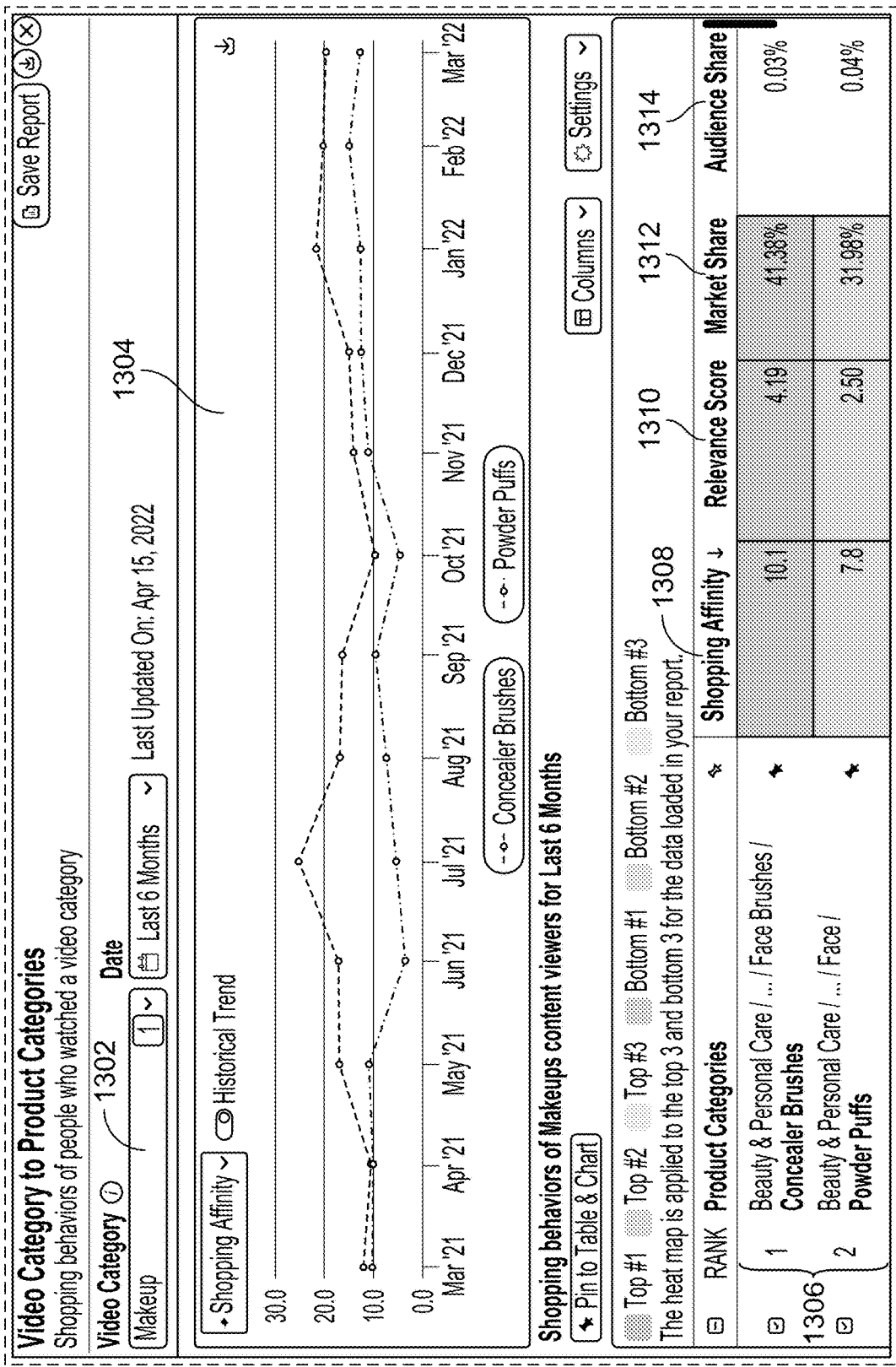
FIG. 13 is a diagram showing an example user interface that shows correlation values between specified video category IDs to product category IDs in accordance with some embodiments.

FIG. 13 is a diagram showing an example user interface that shows correlation values between specified video category IDs to product category IDs in accordance with some embodiments. For example, user interface 1300 is generated after a user had selected the video category IDs to product category IDs type of request in dropdown menu 1102 in user interface 1100 of FIG. 1 and then selected "Makeup" as the makeup in dropdown menu 1302 whose videos for which correlation values will be determined with each of various product category IDs. For example, a process such as process 700 of FIG. 7 can be performed to generate correlation values between the videos associated with video category ID "Makeup" and each of various product category IDs. In the example of user interface 1300, between the videos associated with video category ID "Makeup" and each of various product category IDs, four correlation values were determined: Shopping Affinity, Relevance Score, Market Share, and Audience Share. Section 1306 shows a portion of the list of product category IDs that are ranked by their respective correlation values (Shopping Affinity) to video category "Makeup." Furthermore, the two top ranked product category IDs of "Concealer Brushes" and "Powder Puffs" were selected to have their respective historical Shopping Affinities 1308 relative to video category ID "Makeup" be plotted across different points in time in the last 12 months in plot 1304. The brand IDs in section 1306 can be ranked by another correlation value (e.g., Relevance Score 1310, Market Share 1312, and Audience Share 1314) in response to a user selection of one such other correlation value.

Figure 14:
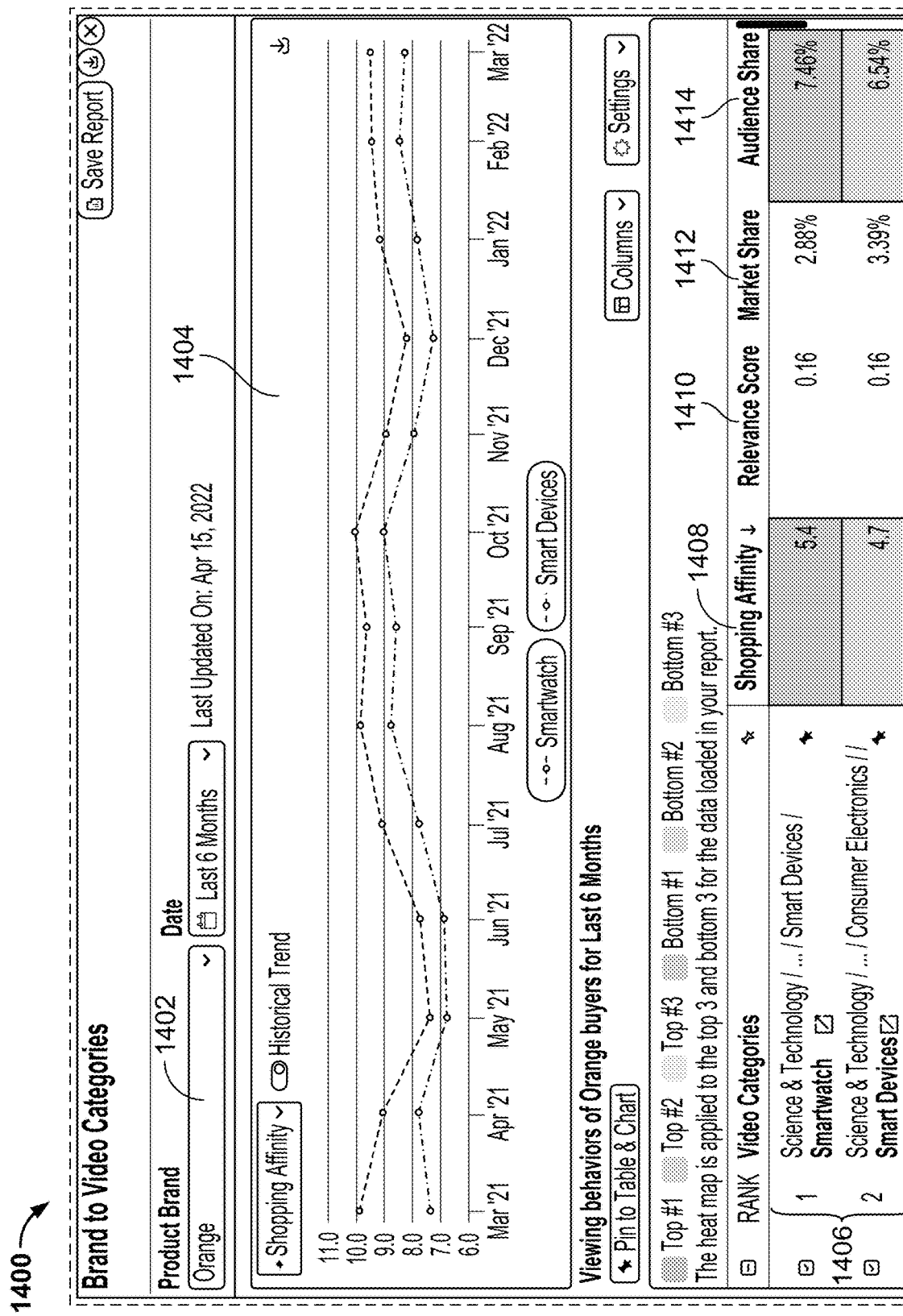
FIG. 14 is a diagram showing an example user interface that shows correlation values between a specified brand ID to video category IDs in accordance with some embodiments.

FIG. 14 is a diagram showing an example user interface that shows correlation values between a specified brand ID to video category IDs in accordance with some embodiments. For example, user interface 1400 is generated after a user had selected the brand ID to video category IDs type of request in dropdown menu 1102 in user interface 1100 of FIG. 1 and then product brand ID "Orange" as the makeup in dropdown menu 1402 whose videos for which correlation values will be determined with each of various video category IDs. For example, a process such as process 800 of FIG. 8 can be performed to generate correlation values between the products associated with brand ID "Orange" and each of various video category IDs. In the example of user interface 1400, between the products associated with brand ID "Orange" and each of various video category IDs, four correlation values were determined: Shopping Affinity, Relevance Score, Market Share, and Audience Share. Section 1406 shows a portion of the list of video category IDs that are ranked by their respective correlation values (Shopping Affinity) to brand ID "Orange." Furthermore, the two top ranked video category IDs of "Smartwatch" and "Smart Devices" were selected to have their respective historical Shopping Affinities 1408 relative to brand ID "Orange" be plotted across different points in time in the last 12 months in plot 1404. The video category IDs in section 1406 can be ranked by another correlation value (e.g., Relevance Score 1410, Market Share 1412, and Audience Share 1414) in response to a user selection of one such other correlation value.

Figure 15:
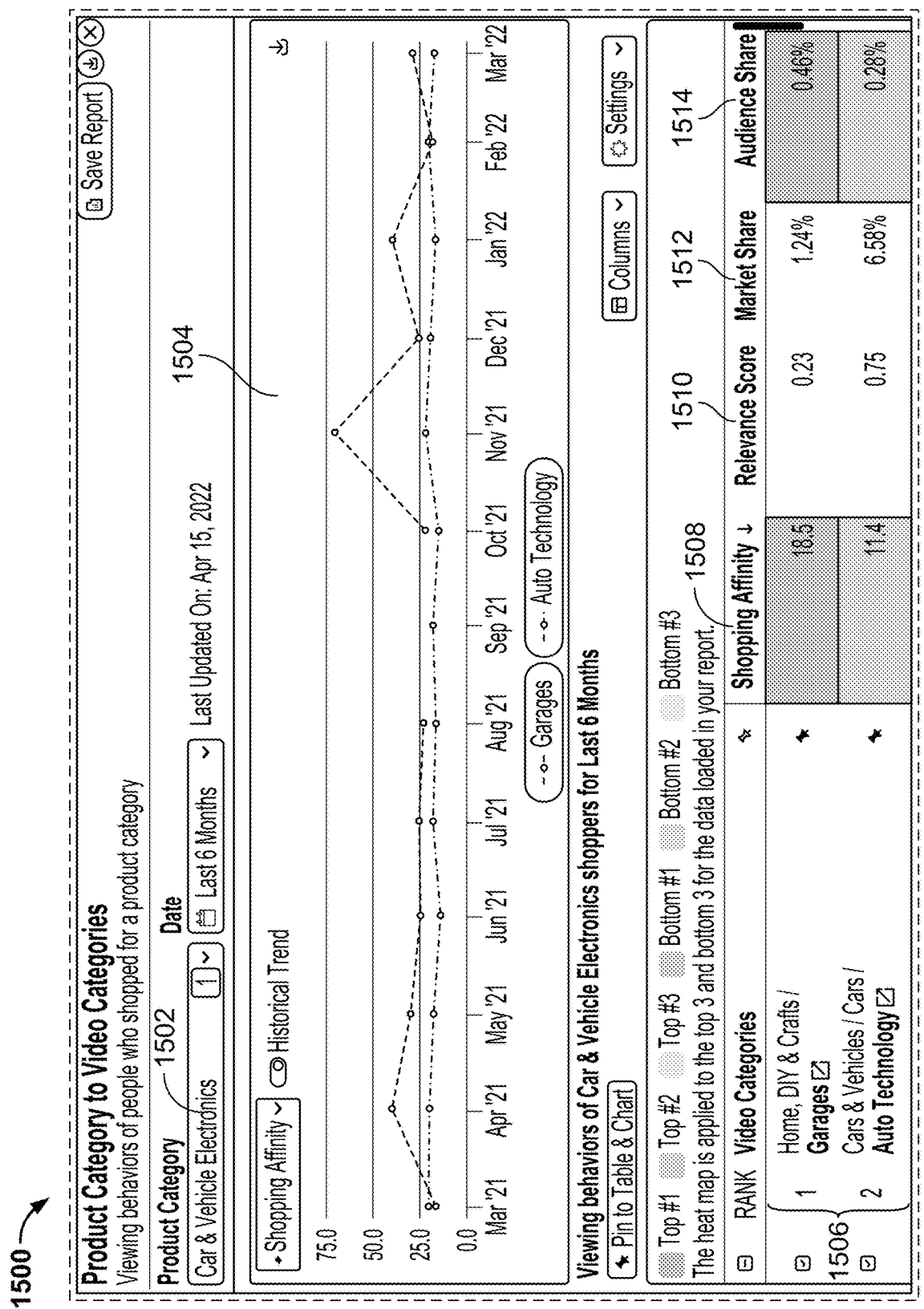
FIG. 15 is a diagram showing an example user interface that shows correlation values between a product category ID to video category IDs in accordance with some embodiments.

FIG. 15 is a diagram showing an example user interface that shows correlation values between a product category ID to video category IDs in accordance with some embodiments. For example, user interface 1500 is generated after a user had selected the product category ID to video category IDs type of request in dropdown menu 1102 in user interface 1100 of FIG. 1 and then product category ID "Car & Vehicle Electronics" as the makeup in dropdown menu 1502 whose videos for which correlation values will be determined with each of various video category IDs. For example, a process such as process 800 of FIG. 8 can be performed to generate correlation values between the products associated with product category ID "Car & Vehicle Electronics" and each of various video category IDs. In the example of user interface 1500, between the products associated with product category ID "Car & Vehicle Electronics" and each of various video category IDs, four correlation values were determined: Shopping Affinity, Relevance Score, Market Share, and Audience Share. Section 1506 shows a portion of the list of video category IDs that are ranked by their respective correlation values (Shopping Affinity) to product category ID "Car & Vehicle Electronics." Furthermore, the two top ranked video category IDs of "Garages" and "Auto Technology" were selected to have their respective historical Shopping Affinities 1508 relative to product category ID "Car & Vehicle Electronics" be plotted across different points in time in the last 6 months in plot 1504. The video category IDs in section 1506 can be ranked by another correlation value (e.g., Relevance Score 1510, Market Share 1512, and Audience Share 1514) in response to a user selection of one such other correlation value.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
obtain a plurality of recorded video interactions;
obtain a plurality of recorded non-video interactions;
store, at a database, event data determined based at least in part on the plurality of recorded video interactions and the plurality of recorded non-video interactions, wherein the database comprises a plurality of storage nodes; and
determine a subset of the event data that comprises correlations between a video and non-video interactions, wherein to determine the subset of the event data that comprises correlations between the video and the non-video interactions comprises to:
receive a request to determine correlation values between a given set of videos and non-video category identifiers (IDs);
search the database for a set of video event data that describes a set of panelist IDs' interactions with the given set of videos, wherein data entries pertaining to a same panelist ID are stored contiguously on a single storage node from the plurality of storage nodes;
search the database for a set of non-video event data that describes the set of panelist IDs' interactions with the non-video category IDs;
for a non-video category ID included in the set of non-video event data, determine an overlap value comprising a number of distinct panelist IDs that have interacted with the given set of videos and have performed interactions associated with the non-video category ID within an attribution window;
determine a respective correlation value between the given set of videos and the non-video category ID based at least in part on the overlap value; and
output, at a user interface, the non-video category ID in a ranked list of at least a portion of the non-video category IDs based on the respective correlation value between the given set of videos and the non-video category ID; and
a memory coupled to the processor and configured to provide the processor with instructions.

2. The system of claim 1, wherein the processor is further configured to:
  receive a new set of recorded user online activity data; and
  in response to receipt of the new set of recorded user online activity data, delete existing events associated with an existing set of recorded user online activity data from the database.

3. The system of claim 1, wherein to store, at the database, the event data comprises to:
  query video metadata relevant to the plurality of recorded video interactions;
  store video interaction events in the database based on the plurality of recorded video interactions and the video metadata;
  query non-video metadata relevant to the plurality of recorded non-video interactions; and
  store non-video interaction events in the database based on the plurality of recorded non-video interactions and the non-video metadata.

4. The system of claim 1, wherein to store, at the database, the event data comprises to sort the event data by panelist identifiers (IDs) and timestamps.

5. The system of claim 1, wherein the processor is further configured to compute one or more cardinalities based on the event data prior to receiving a request for correlation values between the video and the non-video interactions.

6. The system of claim 5, wherein the one or more cardinalities include one or more of the following: a video ID cardinality, a video creator ID cardinality, a video category ID cardinality, and a video panelist ID cardinality.

7. The system of claim 1, wherein the processor is further configured to compute one or more cardinalities based on the event data in response to receiving a request for correlation values between the video and the non-video interactions.

8. The system of claim 1, wherein the non-video interactions comprise product interactions, and wherein the non-video category IDs comprise product category IDs.

9. The system of claim 1, wherein the respective correlation value comprises one or more of the following: an affinity, a market share, an audience share, and a relevance.

10. A method, comprising:
  obtaining a plurality of recorded video interactions;
  obtaining a plurality of recorded non-video interactions;
  storing, at a database, event data determined based at least in part on the plurality of recorded video interactions and the plurality of recorded non-video interactions, wherein the database comprises a plurality of storage nodes; and
  determining a subset of the event data that comprises correlations between a video and non-video interactions, wherein determining the subset of the event data that comprises correlations between the video and the non-video interactions comprises:
  receiving a request to determine correlation values between a given set of videos and non-video category identifiers (IDs);
  searching the database for a set of video event data that describes a set of panelist IDs' interactions with the given set of videos, wherein data entries pertaining to a same panelist ID are stored contiguously on a single storage node from the plurality of storage nodes;
  searching the database for a set of non-video event data that describes the set of panelist IDs' interactions with the non-video category IDs;
  for a non-video category ID included in the set of non-video event data, determining an overlap value comprising a number of distinct panelist IDs that have interacted with the given set of videos and have performed interactions associated with the non-video category ID within an attribution window;
  determining a respective correlation value between the given set of videos and the non-video category ID based at least in part on the overlap value; and
  outputting, at a user interface, the non-video category ID in a ranked list of at least a portion of the non-video category IDs based on the respective correlation value between the given set of videos and the non-video category ID.

11. The method of claim 10, further comprising:
  receiving a new set of recorded user online activity data; and
  in response to receipt of the new set of recorded user online activity data, deleting existing events associated with an existing set of recorded user online activity data from the database.

12. The method of claim 10, wherein storing, at the database, the event data comprises:
  querying video metadata relevant to the plurality of recorded video interactions;
  storing video interaction events in the database based on the plurality of recorded video interactions and the video metadata;
  querying non-video metadata relevant to the plurality of recorded non-video interactions; and
  storing non-video interaction events in the database based on the plurality of recorded non-video interactions and the non-video metadata.

13. The method of claim 10, further comprising computing one or more cardinalities based on the event data prior to receiving a request for correlation values between the video and the non-video interactions.

14. The method of claim 10, further comprising computing one or more cardinalities based on the event data in response to receiving a request for correlation values between the video and the non-video interactions.

15. The method of claim 10, wherein the non-video interactions comprise product interactions, and wherein the non-video category IDs comprise product category IDs.

16. The method of claim 10, wherein the respective correlation value comprises one or more of the following: an affinity, a market share, an audience share, and a relevance.

17. A computer program product, the computer program product being embodied in a non-transitory computer readable storage medium comprising computer instructions for:
  obtaining a plurality of recorded video interactions;
  obtaining a plurality of recorded non-video interactions;
  storing, at a database, event data determined based at least in part on the plurality of recorded video interactions and the plurality of recorded non-video interactions, wherein the database comprises a plurality of storage nodes; and
  determining a subset of the event data that comprises correlations between a video and non-video interactions, wherein determining the subset of the event data that comprises correlations between the video and the non-video interactions comprises:
  receiving a request to determine correlation values between a given set of videos and non-video category identifiers (IDs);
  searching the database for a set of video event data that describes a set of panelist IDs' interactions with the given set of videos, wherein data entries pertaining to a same panelist ID are stored contiguously on a single storage node from the plurality of storage nodes;

searching the database for a set of non-video event data that describes the set of panelist IDs' interactions with the non-video category IDs;

for a non-video category ID included in the set of non-video event data, determining an overlap value comprising a number of distinct panelist IDs that have interacted with the given set of videos and have performed interactions associated with the non-video category ID within an attribution window;

determining a respective correlation value between the given set of videos and the non-video category ID based at least in part on the overlap value; and outputting, at a user interface, the non-video category ID in a ranked list of at least a portion of the non-video category IDs based on the respective correlation value between the given set of videos and the non-video category ID.

18. A system, comprising:
a processor configured to:
  obtain a plurality of recorded video interactions;
  obtain a plurality of recorded non-video interactions;
  store, at a database, event data determined based at least in part on the plurality of recorded video interactions and the plurality of recorded non-video interactions, wherein the database comprises a plurality of storage nodes, wherein the non-video interactions comprise product interactions; and
  determine a subset of the event data that comprises correlations between a video and non-video interactions, wherein to determine the subset of the event data that comprises correlations between the video and the non-video interactions comprises to:
    receive a request to determine correlation values between a given set of products and video category identifiers (IDs);
    search the database for a set of product event data that describes a set of panelist IDs' interactions with the given set of products, wherein data entries pertaining to a same panelist ID are stored contiguously on a single storage node from the plurality of storage nodes;
    search the database for a set of video event data that describes the set of panelist IDs' interactions with the video category IDs;
    for a video category ID included in the set of product event data, determine an overlap value comprising a number of distinct panelist IDs that have interacted with the given set of products and have performed video interactions associated with the video category ID within an attribution window;
    determine a respective correlation value between the given set of products and the video category ID based at least in part on the overlap value; and
    output, at a user interface, the video category ID in a ranked list of at least a portion of the video category IDs based on the respective correlation value between the given set of products and the video category ID; and
a memory coupled to the processor and configured to provide the processor with instructions.

* * * * *